Feb. 26, 1963  F. H. ROHR  3,079,487
METHOD AND APPARATUS FOR FABRICATING HONEYCOMB CORE
Filed Oct. 16, 1959  10 Sheets-Sheet 1
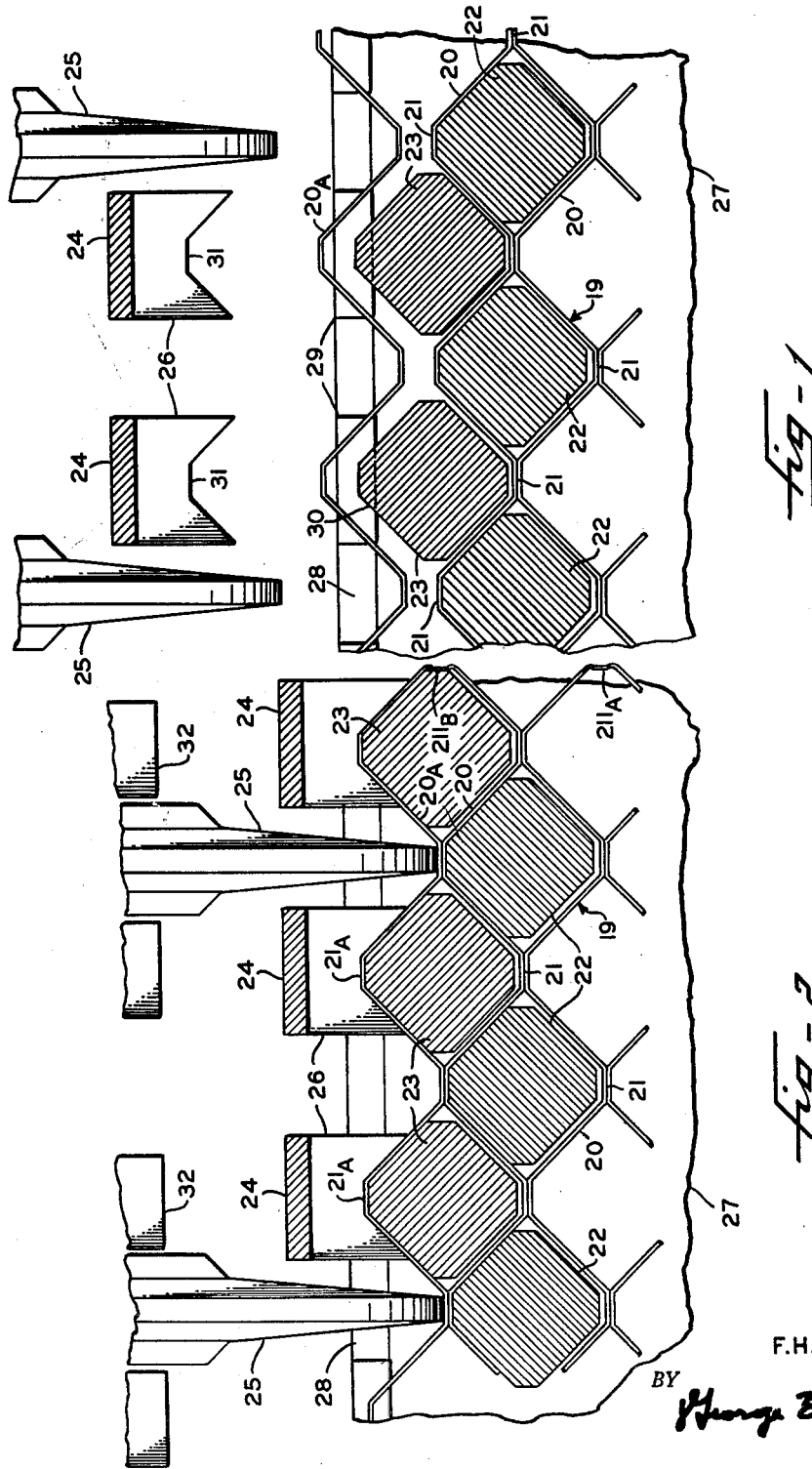
INVENTOR.
F.H.ROHR
BY
*George E. Pearson*
ATTORNEY

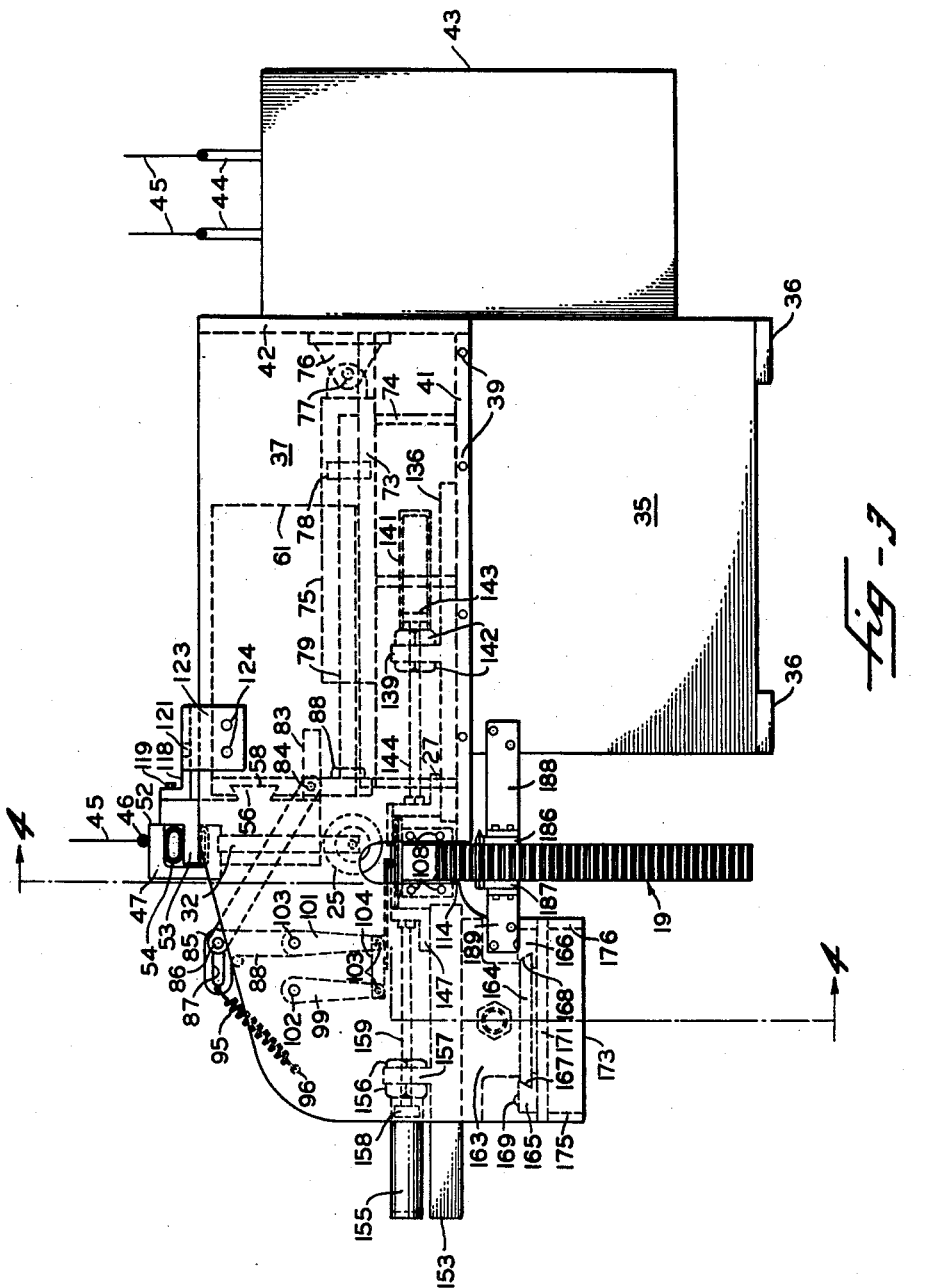

Feb. 26, 1963  F. H. ROHR  3,079,487
METHOD AND APPARATUS FOR FABRICATING HONEYCOMB CORE
Filed Oct. 16, 1959  10 Sheets-Sheet 3
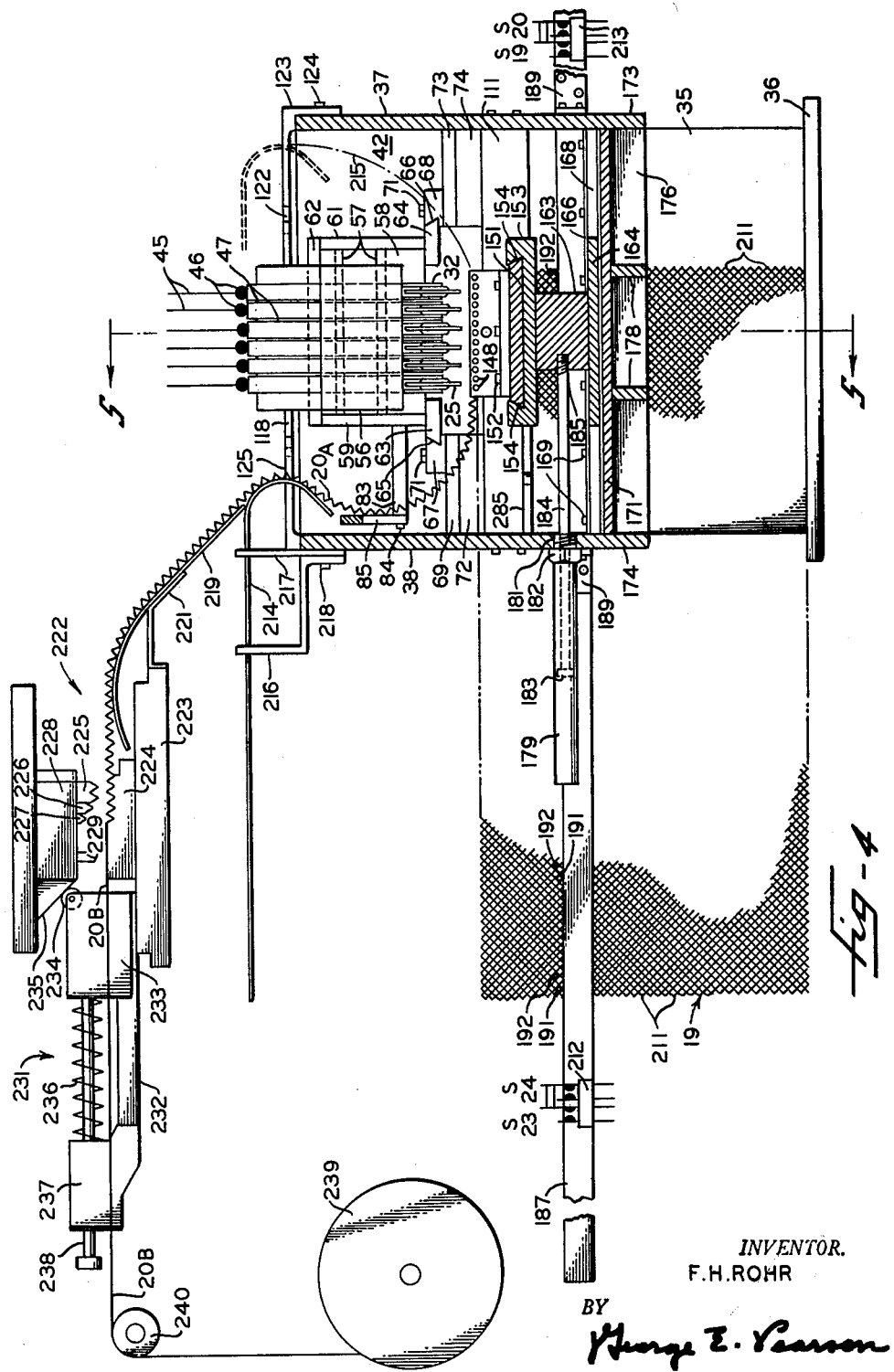
INVENTOR.
F.H.ROHR
BY
George E. Pearson
ATTORNEY Feb. 26, 1963 F. H. ROHR 3,079,487
METHOD AND APPARATUS FOR FABRICATING HONEYCOMB CORE
Filed Oct. 16, 1959 10 Sheets-Sheet 4

INVENTOR.
F. H. ROHR
BY
George E. Pearson
ATTORNEY

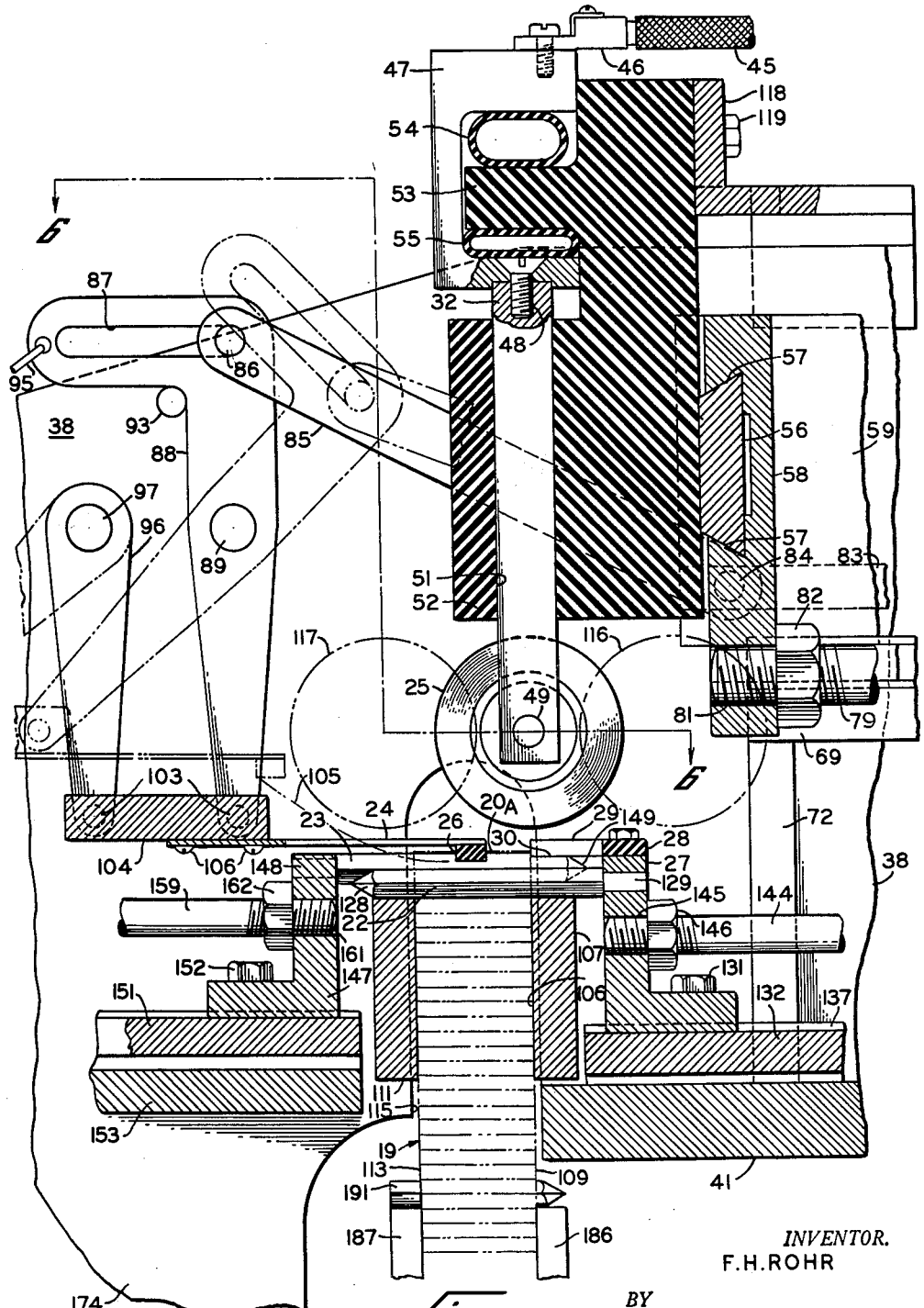

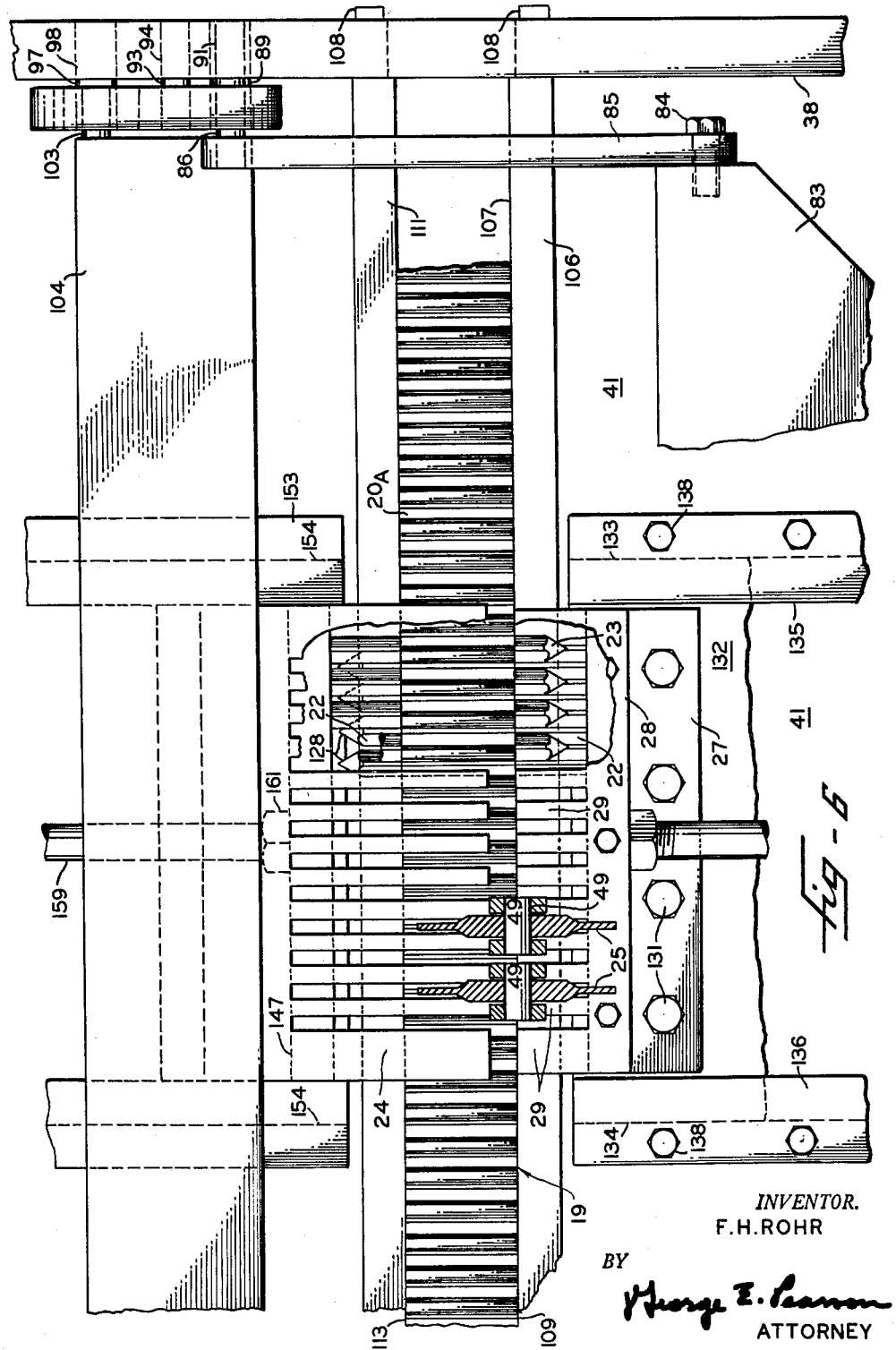

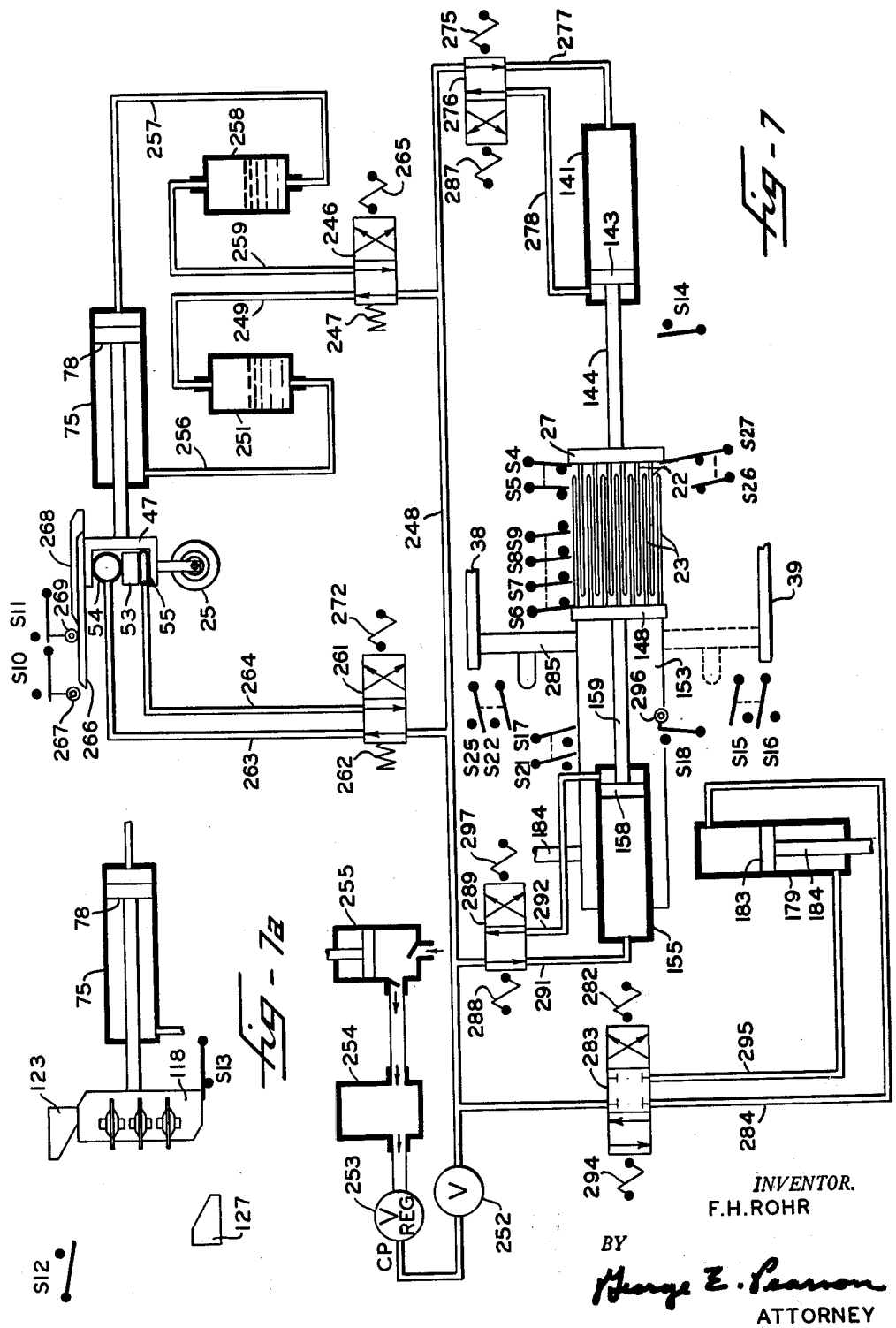

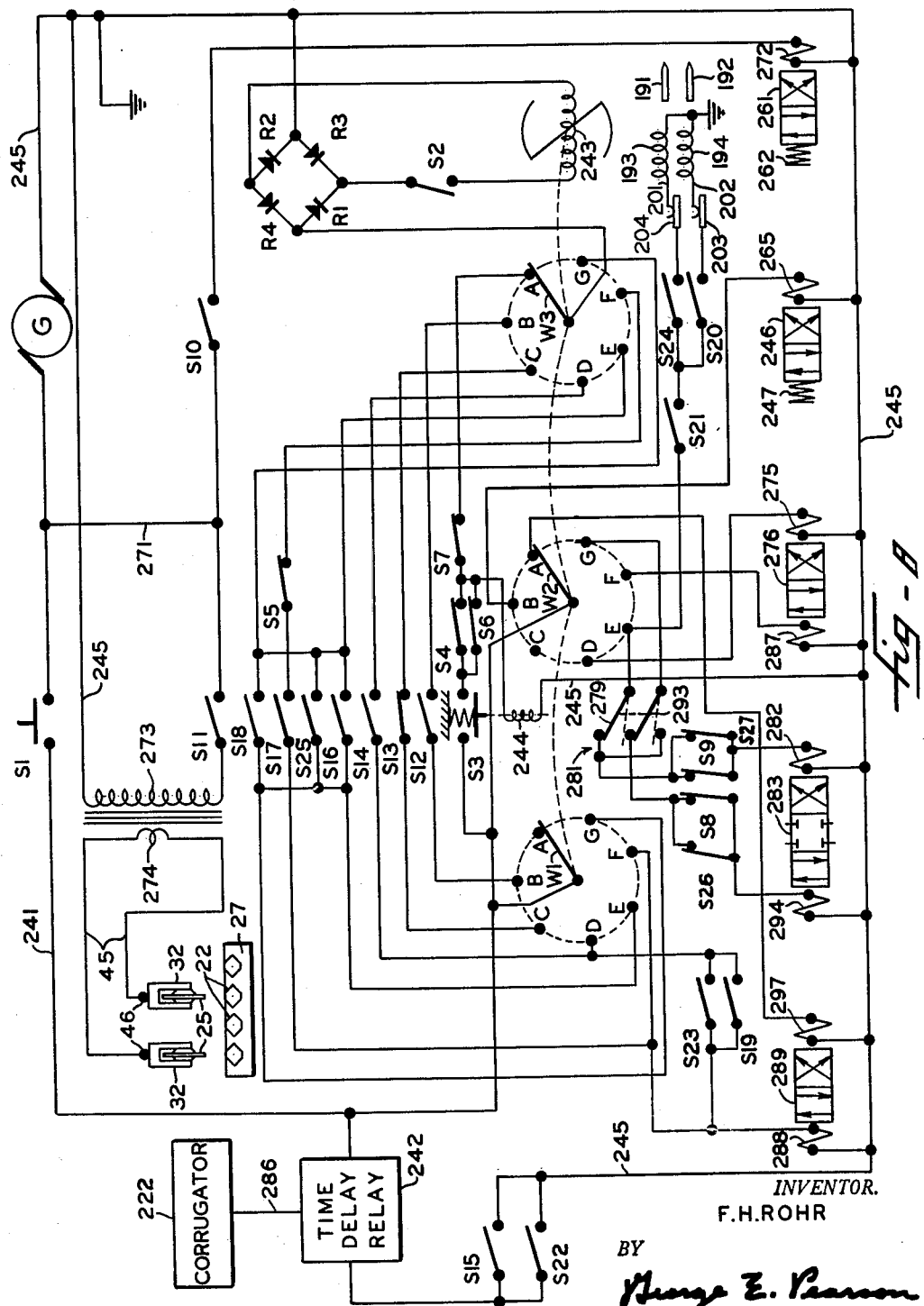

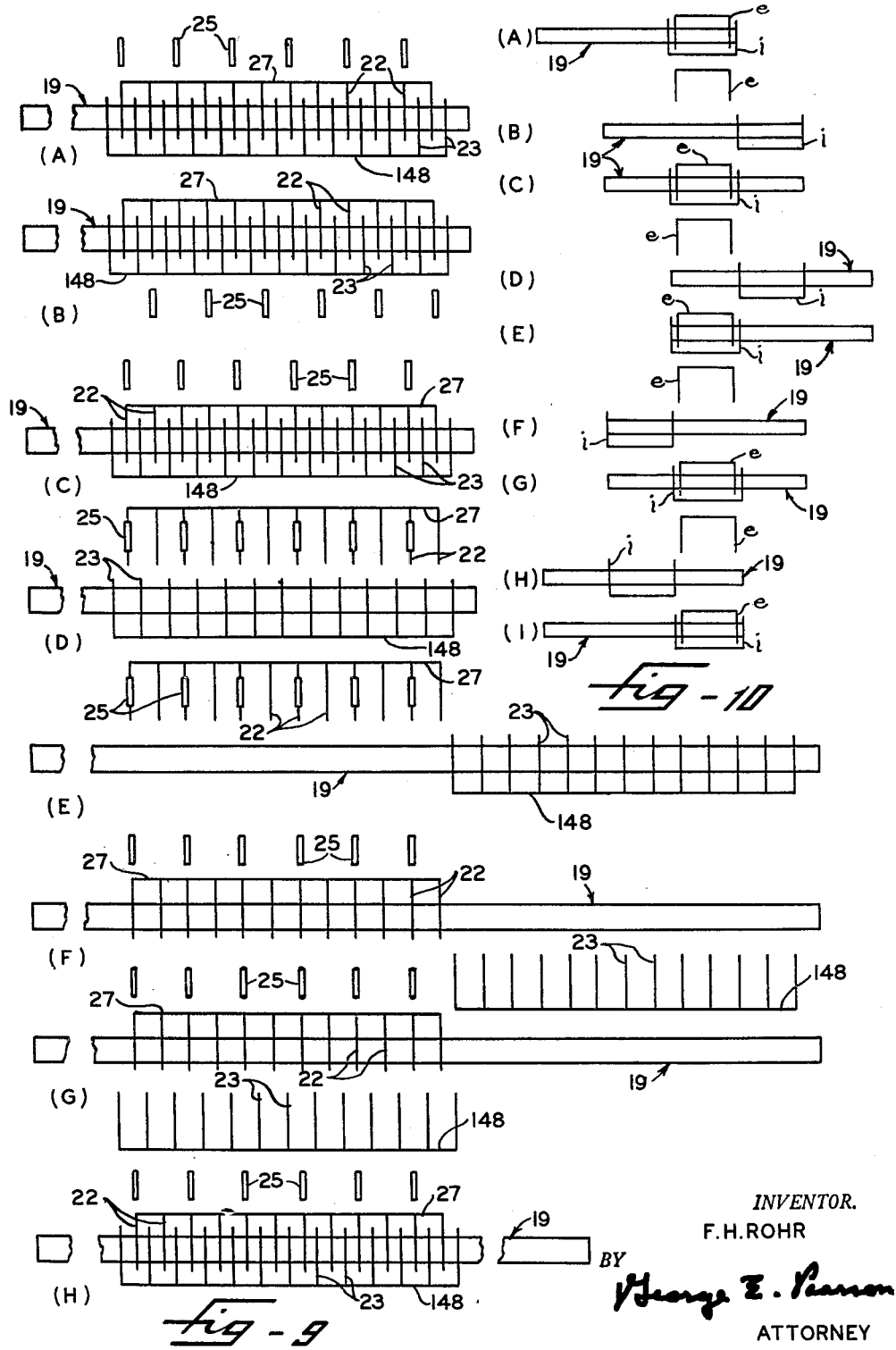

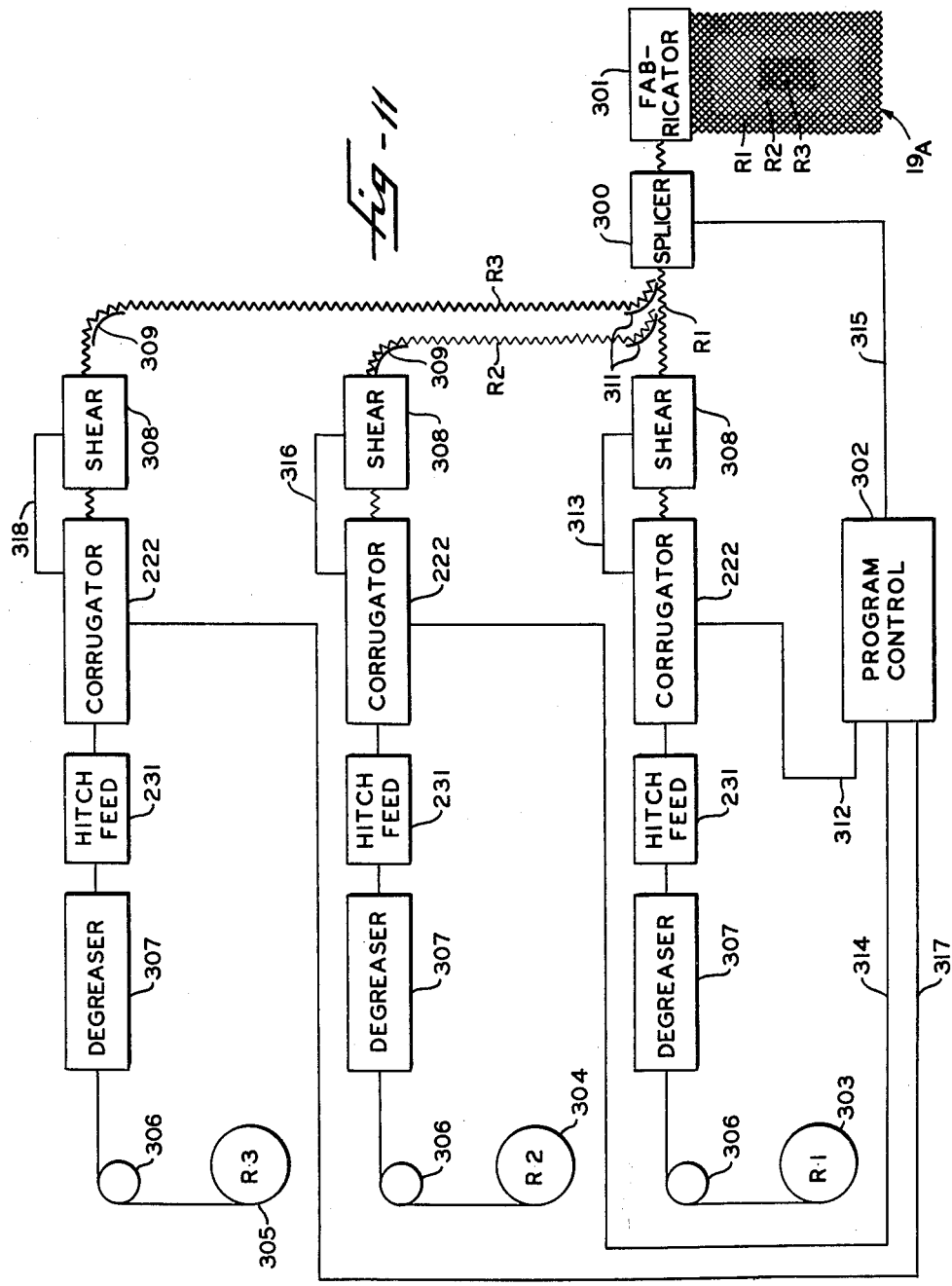

United States Patent Office 3,079,487
Patented Feb. 26, 1963

3,079,487
METHOD AND APPARATUS FOR FABRICATING HONEYCOMB CORE
Fred H. Rohr, 555 San Fernando St., San Diego, Calif.
Filed Oct. 16, 1959, Ser. No. 846,903
16 Claims. (Cl. 219—83)

This invention relates generally to honeycomb core and more particularly to new and improved methods and means for the fabrication of such core from metallic ribbon.

Metal sandwich panels comprising metallic honeycomb core having sheet metal skins are now being used extensively in the fabrication of aircraft and other structures requring strong and light weight metal coverings. Metallic honeycomb core used in the construction of such panels usually is fabricated layer by layer of thin corrugated stainless steel metal strips or ribbons. The ribbons usually have a thickness of the order of .001 inch and, following corrugation and assembly, successive layers of the ribbons are secured together by resistance welding at adjoining nodes.

In order to produce high quality precision metallic honeycomb core having maximum strength with regard to the type of metal used in its cellular construction, it is necessary that the cells be symmetrically formed with resulting uniform shape and size in the fully fabricated and completed core. To accomplish this, undue working and handling of the metallic ribbon such as would strain and distort the same and impair the effectiveness of the resistance welding must be avoided during the corrugating, assemblying and welding of the ribbon.

The foregoing requirements for producing satisfactory honeyocmb core structures have been met to limited degree by various methods and means heretofore devised for fabricating honeycomb core from metallic ribbon. The prior art methods and machines, however, have not been found to be entirely satisfactory in service for one reason or aonther such as complexity and lack of precision of the machines, excessive and time consuming handling of the ribbons and core by the operator, and the inapplicability of the fabricating principles to production methods and operation, to mention a few.

In accordance with the method and machine of the present invention for fabricating honeycomb core, the prior art difficulties and limitations are largely obviated by an arrangement in which an uninterrupted corrugated ribbon is continually supplied from a ribbon feed and a corrugation punch and assembled and welded into successive layers of adjacently disposed oppositely corrugated ribbon sections without limitation as to the length of the core in the ribbon direction or to the width of the core as determined by the number of layers added thereto. The core moves intermittently forth and back over a predetermined length of core and builds up downwardly between two stripper bars by lowering the core with respect to the bars layer by layer.

The stripper bars provide spaced supports for twelve electrode pins which are precision spaced and affixed in a common support bar for unitary movement therewith axially of the pins. Thirteen indexing pins also having a common support bar upon and to which they are precision spaced and affixed for interfitting relationship with the electrode pins are mounted for unitary movement with their support and axially of the pins into interfitting position between two ribbon sections whose abutting nodes to be welded are aligned and resting on the electrode pins.

Six welding wheels are mounted and power driven for movement forward and backward across the ribbon sections above and along alternately spaced electrode pins for passage of welding current through the abutting ribbon nodes interposed therebetween, the wheels being mechanically shifted sidewise one corrugation width for welding of the remaining six nodes on the return sweep of the wheels and for restoring the wheels to their initial position on completion of the welding cycle. The wheels are connected in pairs with their associated pairs of electrodes and respectively energized in series circuits from separate power sources, and the wheels are separately pneumatically loaded for optimum contact pressure.

The electrode and indexing pins are power driven to accomplish the intermittent core movement, the sequence of pin movements for this purpose being:

(1) Withdrawal of the electrode pins from the core;
(2) Shuttling movement of the indexing pins with the core twelve corrugations widths in either direction longitudinally of the ribbon length;
(3) Withdrawal of the indexing pins concurrently with return of the electrode pins into the core;
(4) Shuttling return movement of the indexing pins in the reverse direction to a position of withdrawn alignment between the axes of the electrode pins; and
(5) Re-entry of the indexing pins into interfitting position above and between the electrode fingers.

The corrugated ribbon received from the punch is passed along a guide which is manually shifted to supply the corrugated ribbon to either side of the electrode pins in position above and on the stripper bars.

In accordance with one mode of operation, the machine of the present invention is prepared for starting of fabrication of the core by withdrawing a length of ribbon, sufficient to provide the length of core desired from the guide and over the electrode pins; moving the indexing pins into position thereover; doubling the ribbon back over the indexing pins; and, finally, directing the remaining ribbon in a gentle rising loop to the guide. The machine is then started, the initial ribbon portions being welded first, followed by successive indexing and welding movements until the end of the initially withdrawn ribbon is reached, successive sections of the ribbon having been drawn from the guide during this series of indexing movements. The ribbons are then lowered one-half cell width diagonally after which the guide is moved manually to the other side of the electrode pins which causes the ribbon to be doubled back and over the indexing pins in position for welding and indexing movements in the reverse direction.

The method and machine of the instant invention with its concept of continuous corrugated ribbon feed to the honeycomb core being fabricated and the provision for doubling back of the ribbon over the length of the core to form the successive layers of the core, lends itself very well for the interweave into the core of successive sections of ribbon of varying length and thickness to provide predetermined structural effects in the core in accordance with a prearranged pattern. The ribbon sections of different thickness may be supplied each from its own source and each separately corrugated, spliced to the section of ribbon currently being fed to the core fabricating machine and then, after a measured number of corrugation widths, sheared and spliced to the succeeding ribbon section which is to follow it in the continuous process of interweave of the sections into the core being fabricated.

Since the length of the various ribbon sections as well as their positions relative to the length of the fabricated core is measured in terms of multiples of a corrugation width, the process of interweave lends itself readily to programming control in which the sequence of shearing, splicing, corrugating and fabricating of the ribbon may be timed, measured and computed or counted by the number of corrugations formed in the ribbon from the start of operations in the fabrication of a particular core. Thus, honeycomb core of the so-called "picture frame" and "reinforced slug" types may be fabricated in which strips of core ribbon of varying thicknesses are welded together end to end so that the heavy gauge or light gauge falls into the right location on the finished piece of core to provide desired structural effects and configurations therein.

An object of the present invention is to provide a new and improved method and machine for fabricating high quality precision honeycomb core of uniform cell structure from stainless steel ribbon.

Another object is to provide a method and machine for fabricating honeycomb core from stainless steel ribbon which is adaptable for producing predetermined structural effects and configurations into the core during the process of fabricating the same from corrugated ribbon.

Another object is to provide a new and improved method and means of fabricating honeycomb core in which the dimensions of the core are unlimited both in the direction longitudinally of the ribbons of the core and in the direction transversely of the core ribbon.

Another object is to provide a method and means for fabricating honeycomb core from metallic stainless steel ribbon in which a minimum of handling of the ribbon and core is required during the fabrication of the core.

Another object is to provide a new and improved shuttle feed mechanism for a honeycomb core fabricating machine in which the feed mechanism also functions as a part of the welding system of the machine.

Another object is to provide a method and means of shuttling a honeycomb core in the process of fabrication in a series of increments first in one direction longitudinally of the ribbon layers of the core and then in an equal number of increments in the reverse direction longitudinally of the ribbon length.

Another object is to provide a honeycomb core fabricating method and machine having provision for guiding and directing corrugated ribbon preparatory to welding the nodes of incremental lengths of the ribbon to a core which is shuttled in either direction longitudinally of the ribbon length.

Still another object is to provide a honeycomb core method and machine having provision for concerted driving operations to affect the various movements involved in bonding successive incremental lengths of corrugated ribbon to a core which is shuttled in either direction longitudinally of the ribbon length.

Still another object is to provide simple means operable for supporting and lowering the core as successive layers of the corrugated ribbon are bonded thereto.

Still other objects, features and advantages of the present invention are those inherent in or to be implied from the novel combination, construction and arrangement of parts as will become more fully apparent as the description proceeds, reference being had to the accompanying drawings, wherein:

FIGS. 1 and 2 are enlarged fragmentary views disclosing the relation of parts involved in the assembly and resistance welding of corrugated stainless steel ribbons together to form a honeycomb core, FIG. 1 disclosing the position of parts just prior to assembly of the ribbon being added to the core and FIG. 2 depicting the position of parts during the welding operation;

FIG. 3 is a side elevational view of the honeycomb core fabricating machine of the present invention;

FIG. 4 is a front view of the machine, partly in section, as viewed along the lines 4—4 of FIG. 3;

FIG. 4b is a sectional view taken along the line 4b—4b of FIG. 4a;

FIG. 5 is a somewhat enlarged sectional view taken along the lines 5—5 of FIG. 4;

FIG. 6 is a fragmentary portion of the machine as viewed substantially along the line 6—6 of FIG. 5, certain parts being shown in section to disclose details of structure;

FIG. 7 is a schematic view disclosing the pneumatic driving system for effecting the basic movements of the machine of the present invention and disclosing limit switches which are actuated as a result of these movements;

FIG. 7a is a schematic view of the welding carriage as viewed from beneath the welding wheels;

FIG. 8 is an electrical circuit diagram disclosing the manner in which the limit switches of FIG. 7 are employed to control operation of valves which in turn control the pneumatic and hydraulic driving means disclosed in FIG. 7;

FIG. 9 is a schematic view illustrating the pin and wheel movements involved in a single shuttle movement of the core;

FIG. 10 is a schematic view illustrating the sequence of pin and core movements involved first in shuttling the core over its length in one direction and then over its length in the reverse direction; and FIG. 11 is a diagrammatic view illustrating a core interweave system and method utilizing the honeycomb core fabricating machine of the present invention.

Figure 4A:
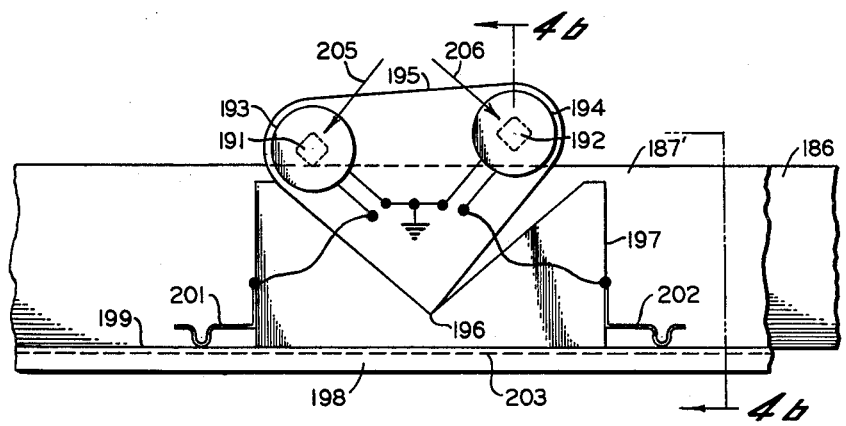
FIG. 4a is a view, in part schematic, of an electrical device suitable for lowering the core layer by layer.

Referring now to the drawings, and first more particularly to FIGS. 1 and 2, there is shown thereon a fragmentary portion of honeycomb core 19 which is formed of a plurality of layers of adjacently disposed oppositely corrugated metallic ribbons 20 which are bonded together at their adjoining nodes 21 as by resistance welding. During the assemblying and bonding of an additional ribbon section 20A to the core, the core is supported on a plurality of electrode pins 22 which are inserted axially of the pins into the upper row of cells of the core. Similarly, a plurality of holding pins 23 are moved axially of the pins and inserted into the cells to be formed by addition of the section 20A of ribbon to the core. Section 20A, as shown in FIG. 1 for purposes of illustration, is spaced considerably above the holding pins 23. It will be understood, however, that in practice, the ribbon section 20A will generally be laid down onto the nodes 21 of the preceding core ribbon 20 such that the pins 23 move beneath and engage ribbon section 20A generally in the position as seen in FIG. 2.

A plurality of holding fingers 24 and welding wheels 25 are shown poised in FIG. 1 in readiness to move into engagement with the ribbon section 20A as shown in FIG. 2. As will appear more fully hereinafter, the fingers 24 approach the holding pins 23 in a movement which is, in part, axially of the pins such that rubber-like tips 26 on the holding fingers 24 position and hold the ribbon strip 20A on the holding fingers 23 just prior to engagement of the welding wheels 25 therewith.

The electrode and holding pins generally conform in cross-section to the configuration of the cell structure desired in the fabricated core and thus insure that the honeycomb cells resulting from the corrugated ribbons assembled and welded thereon will be precisely formed. In practice, it is preferred that the undersurfaces and sides of the electrode and holding pins be cut back sufficiently to provide adequate clearance in the cells to insure against binding of the pins when inserted or withdrawn from the core, this clearance being somewhat exaggerated as shown for purposes of illustration. Relieving of the undersurfaces and sides of the pins still leaves the upper surfaces in conformance with the desired configuration of the cell structure and thus insures precision forming of the fabricated core. To this end, it will be understood that close form fitting of the pins within the cells formed by the corrugated ribbons is desired consistent with a degree of freedom of movement of the pins sufficient to avoid distortion and damage of the thin ribbon which may be formed of stainless steel, for example, having a thickness of the order of .001 inch.

As will hereinafter more fully appear, welding wheels 25 sweep above and along the length of the electrode pins 22 while simultaneously passing welding current through the adjoing nodes disposed therebetween, the width of the wheels in rolling line contact with the upper surface of ribbon section 20A being somewhat less than the width of the nodes in order to avoid burning of the ribbon adjacent the sides of the nodes. Each adjacent pair of welding wheels 25 and the electrode pins 22 in contact therewith through the ribbon nodes being welded constitute a series circuit across a transformer secondary winding which supplies the welding current, the current alternately passing from one wheel and returning to the other. For this purpose, the electrode pins 22 are all connected together electrically through their common support bar 27 which, like the electrode pins 22 and the welding wheels 25, is formed of highly conductive material such, for example, as copper. By reason of this arrangement, the relatively high resistance of the stainless steel of the adjoining nodes 21 comprises the major portion of the resistance in the welding circuit.

A finger bar 28 of nonconductive material is supported on pin support bar 27 and has fingers 29 so arranged as to be supported on holding pins 23 which have undercut surfaces 30 for this purpose. Fingers 29 serve as a back stop against which the ribbon strip 20A is urged by the resilient tips 26 in engagement therewith, it being noted that the undersurface 31 of the tips is formed to conform generally with the corrugations of the ribbon. Holddown tips 26 assure that the ribbon section 20A is properly positioned and held with respect to the preceding ribbon 20 to which it is to be welded, and the holddown tips together with the backstop fingers 29 assure that when the ribbon section 20A is welded to the core it will form a common planar face with the rest of the core such that need for subsequent machining of this face of the core may be obviated.

The welding wheels are axially spaced by two corrugation widths and thus operatively engage alternately spaced electrode pins. As will become more fully apparent as the description proceeds, the welding wheels are mounted for sweeping movement along the electrode pins to resistance weld the alternately spaced nodes in contact therewith. The wheels then move axially thereof one corrugation width and, on the return stroke, sweep back along the electrode pins to weld the remaining intermediate nodes. This arrangement has the advantage that half as many electrode wheels are required as there are electrode pins, and the spacing between the wheels affords ample space for the bifurcated conductor supports 32 for the wheels as well as prevents current flow directly between the wheels through the ribbons lengthwise thereof. The series circuit, including each pair of electrode wheels, has the advantage in that no external electrical connection need be made with the electrode pins, the same merely being shorted together by their common support bar 27. The welding wheels may be caused to move along the electrode pins at a suitable rate in relation to the frequency of the welding current which may be caused to flow 120 times per second, for example, in order to obtain a seam weld at the nodes.

Referring now more particularly to FIGS. 3 to 6 for a description of a machine embodying the aforedescribed pin and wheel structure, there is shown thereon a box-like base 35 having feet 36. The base supports a frame structure comprising spaced side plates 37 and 38 attached to the base by suitable fasteners as at 39, FIG. 3. Extending between the side plates 37 and 38 and affixed thereto by any suitable known means are a bottom plate 41 and a back plate 42. Supported on base 35 and back plate 42 is a control box 43, FIG. 3, which houses the transformers and other control equipment required in the operation of the machine. Terminals 44 from the transformer secondaries are connected as by conductors 45 to terminals 46 mounted on the conductor-actuator members 47 which form part of the electrical circuit to the welding wheels 25. For this purpose each member 47, like the elongated wheel support bar 32 to which is attached as by screw 48, FIG. 5, preferably is formed of highly conductive material such as copper. Bars 32 are bifurcated at their lower ends to receive the welding wheels 25 and carry pins 49 upon which the wheels are rotatively mounted. The bars are slidably supported in elongated openings 51 provided therefor in a block 52 of insulation material.

Conductor-actuator members 47 are generally C-shaped and have horizontal leg portions disposed above and below a projection 53 on block 52 in spaced relation therewith to provide upper and lower chambers for receiving flexible tubes 54 and 55 respectively. The arrangement is such, as best seen in FIG. 5, that inflation of tube 54 produces compression of tube 55 to thus move all of members 47 upwardly relative to block projection 53. This, of course, causes wheel support bars 32 to be moved slidably upward in block 52 to thus elevate the welding wheels. Similarly, inflation of tube 55 causes compression of tube 54 with resultant lowering of members 47 and wheel support bars 32 to lower the welding wheels. This arrangement has the advantage that, while the pneumatic actuator tubes 54 and 55 act simultaneously on all of the members 47, each of the members is actuated individually and yieldably, thereby to thus assure that the welding wheels will all be urged with equal pressure against the nodes to be welded notwithstanding any variations in the thickness thereof.

Block 52 has secured thereto a slide 56 which makes a dovetail connection as at 57 with a supporting plate 58. Plate 58 extends between and is secured to a pair of side plates 59 and 61 which are maintained in spaced relation by one or more cross members 62. As best seen in FIG. 4, side plates 59, 61 on their lower surfaces have affixed thereto slides 63 and 64 respectively which form dovetail connections as at 65 and 66 with track members 67, 68 respectively. Track 67 is supported on a plate 69 and affixed thereto as by fasteners 71. Plate 69, in turn, is supported on and affixed to side plate 38 and a plurality of upstanding plates 72 which are affixed to side plate 38 and bottom plate 41. Similarly, track 68 is supported on a plate 73 which, in turn, is supported on upstanding plates 74, FIG. 4.

Sliding movements of the welding wheel support carriage along the dovetail connections 65, 66 is accomplished by means of a hydraulic cylinder motor 75, FIG. 3, which is pivotally attached to rear plate 42 by means of a bracket 76 to which it makes pivotal connection as at 77. Hydraulic cylinder motor 75 has a piston 78 having the usual piston rod 79 which makes a threaded connection as at 81, FIG. 5, with plate 58 of the welding wheel support carriage, a nut 82 being employed to secure the threaded connection.

Side plate 59 of the welding carriage has an arm 83 suitably secured thereto as best seen in FIG. 4, this arm extends into the vicinity of frame side plate 38 where it makes pivotal connection as at 84 with a link 85. As best seen in FIGS. 3, 5, and 6, the opposite end of link 85 carries a pivot 86 which slides in a slot 87 provided in a bell crank 88. Bell crank 88 is pivotally mounted on a pin 89, FIG. 5, which is supported on and secured to side frame plate 38 as at 91, FIG. 6. A pin 93, also secured to side frame plate 38 as at 94, serves as a stop against which bell crank 88 is biased as by a spring 95 which interconnects the bell crank with side frame plate 38 as at 96, FIG. 3.

A crank 96, FIG. 5, similar to the lower portion of bell crank 88 is similarly supported on a pivot pin 97 which is secured to side frame plate 38 as at 98, FIG. 6.

As best seen in FIG. 3, similar cranks 99 and 101 are pivotally supported on pins 102 and 103 respectively, these pins being affixed to and supported on side frame plate 37. Pivot pins 102 and 103 have the same spaced relationship therebetween as pivot pins 89 and 97 mounted on side frame plate 38, and all of these pivot pins are arranged such that they lie in the same horizontal plane. The lower ends of cranks 88, 96, 99 and 101 are pivotally secured as at 103 to a connecting beam 104. These cranks all have the same effective arm length such that beam 104 maintains a parallel relationship with the aforesaid horizontal plane which passes through the axes of pivot pins 89, 97, 102, and 103. By reason of this arrangement, any point on beam 104 will move in a circular path of the same radius as that of pivot pins 103 as the cranks oscillate about their respective axes.

This path of movement of beam 104 is also imparted to ribbon hold down tips 26, as indicated by the dashed line 105 in FIG. 5, by reason of the attachment of ribbon holding fingers 24 to beam 104 as at 106. By reason of this arrangement, as the hold down tips 26 move along path 105 from their dotted line position as shown in FIG. 5, they are progressively lowered as they approach ribbon 20A resting on holding and indexing pins 23, the path of movement being such that the tips engage the ribbon with yieldable holding force just prior to the final movement of bell crank 88 against stop 93 and such that, during this final movement, the holding tips move substantially parallel to the axes of holding pins 23 with the result that the ribbon thereon is yieldably urged by the holding tips 26 into abutting engagement with the ends of fingers 29 of finger bar 28.

When the finger bar 28 is in this position, as best seen in FIG. 5, the ends of fingers 29 are in alignment with the face 106 of a stripper bar 107 which extends between and is secured to side frame plates 37 and 38 as by suitable fasteners 108. Face 109 of core 19 is built up with reference to face 106 of stripper bar 107 acting as a guide surface, and the movement of each additional ribbon layer into alignment with this surface by abutting engagement with fingers 29 of finger bar 28 assures that these edges of the successive ribbon layers will all lie in the same plane defined by face 106 of stripper bar 107. A similar stripper bar 111 also extends between the frame plates 37 and 38 and secured thereto as by fasteners 108, this stripper bar being so mounted such that its face 112 is disposed adjacent face 113 of core 19 with sufficient clearance being provided therebetween to assure freedom of sliding movement of the core downwardly between the stripper bars as the core is lowered to add successive ribbon layers thereto, as will more fully appear as the description proceeds. Side frame plates 37 and 38 are slotted as at 114 and 115 respectively to provide for shuttling of the core beyond either side of the machine, it being noted with particular reference to FIG. 5, that the width of each of aligned openings 114, 115 is somewhat greater than the spacing between the stripper bars 107 and 111 in order that precision forming of the opposed faces of the core 19 remains the province of the stripper bars.

With the parts of the machine positioned as shown in FIGS. 3, 5, and 6, welding wheels 25 are in a position to which they have been moved by the welding carriage from the retracted position indicated by the dashed line 116. During this movement of the wheels, bell crank 88 moves from its dashed line position to the full line position shown and, likewise, the ribbon holding tips 26 move from their dashed line positions along the path 105 into their final ribbon holding positions as indicated in FIG. 5. During this movement of bell crank 88 there is no driving connection of the bell crank with pin 86 on link 85. Their relative positions, however, are maintained as bell crank 88 is rocked under power of coil spring 95 to position the holding fingers relative to the core ribbon as aforementioned. As will more fully appear subsequently, wheels 25 while in the full line position of FIG. 5 are lowered by inflating tube 55 to thus engage the ribbon nodes to be welded. As the wheels then sweep across the nodes to perform the welding operation, pin 86 on link 85 merely rides in slot 87 in bell crank 88 with the result that ribbon holders 26 retain their holding positions during the welding operation. On reaching the other side of the core, the wheels are elevated to their positions indicated by the dashed line 117, this being accomplished by inflating tube 54. The elevation is sufficient such that the wheels clear the holding fingers 24 on shifting axially for subsequent lowering into engagement with the intermediate nodes and return sweep of the wheels back across the core. During this movement of the wheels, the pin 86 again merely rides in slot 87, still leaving the holding tips 26 undisturbed in ribbon engaging position as shown in FIG. 5. Upon completion of the welding on the return sweep and the elevation of the wheels to their full line position as seen in FIG. 5, further movement of the welding carriage to move the wheels from this full line position to the dash line position 116 causes pin 86 to drive bell crank 88 to its dashed line position and likewise moves the holding tips 26 from their position of engagement with the core back along the path 105 to their retracted position, as indicated by the dash lines in FIG. 5.

In order to provide for the sidewise shift of welding wheels 25 along their lined pivot axes, an angle bracket 118 is secured to block 52 as by suitable fasteners 119. Angle bracket 118 has a beveled surface 121, FIG. 3, which, as the welding carriage approaches its fully retracted position, engages a similar beveled surface 122, FIG. 4, on an angle bracket 123 which is secured to side frame member 37 as by suitable fastener means 124. The cam action of the engaging beveled surfaces 121 and 122 causes block 52 to slide along the dovetailed connection 57 with plate 58 to thus move the wheels 25 to the left to their positions as best seen in FIG. 4. In similar manner, as the welding carriage approaches its foremost position, and after the wheels 25 have been elevated, engaging beveled surfaces on the opposite side of bracket 118 and on a bracket 125 supported and affixed to side frame member 38 causes block 52 to be shifted along its dovetail connection 57 by cam action of the engaging beveled surfaces to the right as viewed in FIG. 4 by one corrugation width to thus position the welding wheels 25 for lowering movement into engagement with the intermediate nodes to be welded.

Stripper bars 107 and 111 provide a bridging support for electrode pins 22 as may best be seen in FIG. 5. Furthermore, it will be apparent that stripper bar 107 tends to hold the position of the core as the electrode pins 22 are withdrawn axially from the cells of the core 19 in which they are inserted and, similarly, upon re-entry of the electrode pins 22 into the cells of the core the stripper bar 111 likewise holds the core firmly to facilitate this movement of the pins, it being recalled that the pins interfittingly engage the cells of the core with a minimum of clearance sufficiently only to insure freedom of movement of the pins into and out of the cells of the core. To facilitate entry into the core, the electrode pins 22 preferably are pointed at their tips as indicated at 128. The opposite ends of the electrode pins are reduced as at 129 to provide a press fit engagement with their common support member 27, or otherwise suitably secured thereto.

To provide for axial movement of the electrode pins into and out of the core, their common support member 27 preferably is formed of angle stock and secured by suitable fasteners 131 to a plate 132 which makes a dovetailed connection as at 133 and 134 with track members 135 and 136 respectively. Tracks 135 and 136 are secured to base plate 41 as by suitable fastening means 138, FIG. 6. An upstanding plate 139, FIG. 3, is supported on and suitably secured to track 135 and 136 and, in turn, supports an air cylinder motor 141 to which it is secured as by the opposed nuts 142. Cylinder motor 141 has a piston 143 having a piston rod 144 which makes a threaded connection with electrode pin support bar 27 as at 145 and secured thereto by the lock nut 146, as may best be seen in FIG. 5.

In contrast with the electrode pins 22, the holding or indexing pins 23 are formed of relatively low conducting material such, for example, as steel, as is their common support bar 147 to which they are secured as by making a forced fit therewith, the pins, for this purpose having a reduced diametrical end portion 148, FIGS. 4 and 5. As in the case of the electrode pins, the holding or indexing pins 23 have pointed tips 149 in order to facilitate entry into the core and beneath the ribbon section being added thereto.

Support bar 147 for the indexing pins 123 is formed of angular stock and secured to a slide plate 151 as by suitable fastening means 152. Slide 151 is movably supported by a plate 153 with which it make dovetail connections indicated at 154, FIG. 4. Power means for moving pin assembly 23 including slide 151 relative to plate 153 is provided by the air cylinder motor 155 which is secured as by nuts 156 presented in opposed relation to a mounting plate 157, in turn, suitably mounted and secured to plate 153. Air cylinder motor 155 has a piston 158 having a rod 159 which makes threaded connection with the pin support bar 147 as at 161 and secured thereto by the locking nut 162.

Plate 153 is supported on and suitably secured to a plate 163, FIG. 4, which, in turn, is supported on and suitably affixed to a slide 164 which is mounted for sliding movement in tracks 165 and 166, FIG. 3, with which it makes dovetail connections as at 167 and 168 respectively. Tracks 165 and 166 are secured as by suitable fastening means 169 to a base plate 171 which extends between and is suitably secured to depending portions 173 and 174 of side frame members 37 and 38 respectively. Base 171 further comprises and is strengthened by vertically disposed cross members 175 and 176 and vertically disposed longitudinal members 178, FIG. 4, which extend between the cross members.

As may best be seen in FIG. 4, power means for moving the indexing pins and its supporting structure including slide 164 to either side of the central position shown in FIG. 4 and selectively adjacent to the side frame members 37 and 38 respectively, is provided by an air cylinder motor 179 which makes a threaded connection with side frame plate 38 as at 181 and secured thereto by the lock nut 182. Cylinder motor 179 has a piston 183 having a piston rod 184 which makes threaded connection with plate 163 as at 185.

Prior to welding of the ribbon layer being added to the core, the core portion disposed between side frame members 37 and 38 is generally supported by the electrode pins 22. After welding of all the modes has been completed following forward and return sweeps of the welding wheels 25, the electrode pins 22 are withdrawn from the core and the core is then supported by the indexing pins 23 by reason of the ribbon section disposed thereabove which has just been bonded to the core. Support of the core by the indexing pins continues, as the core is shuttled thereby to the right or to the left as viewed in FIG. 4. When the indexing movement is complete, the electrode pins reenter the core as the indexing pins withdraw therefrom. Thus, during the indexing movement of the machine along the length of the core in adding the new ribbon layer thereto, the portion of the core between the side frame members 37 and 38 is supported by either or both sets of the electrode and indexing pins. When the end of the core is reached, however, both indexing and electrode pins must be removed therefrom in order to lower the core to proper position for addition of the new ribbon layer thereto. It is therefore necessary at such time to provide supplemental means, presently to be described, for supporting the core, this means also serving to support those portions of the core which extend laterally beyond the sides of frame members 37 and 38.

This supplemental core support simply comprises a pair of elongated members 186 and 187 disposed respectively below stripper bars 107 and 111 and, like the stripper bars are disposed substantially in face adjacency with respect to opposite faces 109 and 113 of the core. Member 186 is connected by suitable angle brackets 188, FIG. 3, to opposite sides of base 35, and member 187 is similarly connected by suitable angle brackets 189 to the depending portions 173 and 174 of side frame members 37 and 38 respectively, FIG. 4. Members 186 and 187 may extend for considerable distance of the order of upwards of 20 feet beyond frame side plates 37 and 38 of the machine and may thus be employed to fabricate panels of honeycomb core of great length as measured along the length of the ribbons. In any event, the length of the core will be a multiple of the length of shuttling movement of the core in either direction. Suitable means, not shown, may be employed to support the extended end portions of members 186 and 187 when this is necessary in the fabrication of core of relatively great dimensions and weight.

A plurality of manually insertable pins 191 are employed to support the core on members 186 and 187, these pins bridging across these members much in the same manner as the electrode pins bridge and rest upon stripper bars 107 and 111. When it is desired to lower the core, both electrode and indexing pins being withdrawn therefrom, it merely becomes necessary to withdraw the pins 191 to permit the core to fall vertically between bars 186 and 187 until pins 192 engage the elongated members 186 and 187 in the same manner. Thus, pins 192 may have been positioned one-half cell width above the pins 191 and, further, upon withdrawal of the pins 191, they may be inserted into suitable cells disposed a half-cell width above pins 192 to thus place the core in readiness for a subsequent lowering movement with respect to support bars 186 and 187. It will be understood that pins 191 and 192 could be operated by solenoids, for example, when it becomes desirable to make this lowering operation of the core fully automatic.

Figure 4B:
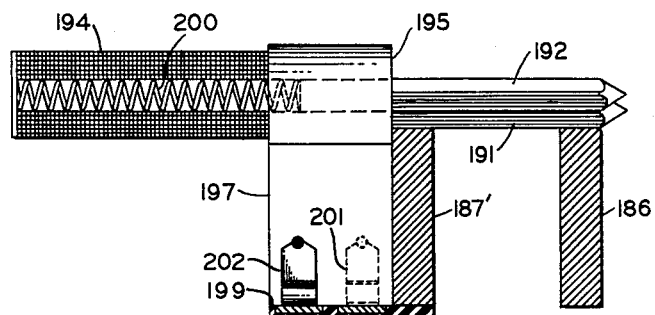

In the partially schematic arrangement disclosed in FIGS. 4a and 4b, pins 191 and 192 are disclosed as spring urged plungers of solenoids 193 and 194 respectively, the springs 200 being arranged such that the pins 191 and 192 are normally urged thereby into the core and in bridging relation with respect to core support members 186 and 187. It will be understood, of course, that only one of pins 191 or 192 is actually in engagement with the members 186 and 187 at any time. Solenoids 193 and 194 are mounted on a heart shaped cam 195 which is supported for rocking movement as at 196 in a V-shaped block 197. Block 197 is slidably supported upon member 187 which for this purpose is formed as a member of angular configuration designated 187' and having the horizontally extending leg 198. The upper surface 199 of leg 198 upon which block 197 slides has a pair of spaced electrically conducting tracks 203 and 204 which are respectively engaged by sliding contacts 202 and 201 which are suitably carried by block 197. These slide contacts are respectively engaged by terminals of solenoids 193 and 194, the other terminals of which are grounded.

It will be understood, that when it is desired to lower the core 19, that the same must also be shifted either to the right or to the left, as the case may be, by one-half cell width, the movement effectively being diagonally downward at 45° either to the right or to the left as viewed in FIG. 4 and as indicated by the arrows in FIG. 4a. In the arrangement of the parts as shown in FIG. 4a in which it is assumed that the core is supported by pins 191, when solenoid 193 is energized, pin 191 is withdrawn into the solenoid and pin 192 moves in the direction of arrow 206 by reason of the pivotal point 196 which its support 195 makes with block 197 and thus causes the core now supported by pins 192 to be similarly rocked. As pin 192 moves to engage the surfaces of support members 186 and 187, pin 191 moves in a direction reverse to that indicated by arrow 205 to assume a position upon de-energization of solenoid 193 which will permit pin 191 to enter into a cell of the core disposed one-half cell width above the core support members 186 and 187 and thereby be in readiness for the next or subsequent lowering of the core after another ribbon layer has been bonded thereto. When this operation is completed, and solenoid 194 energized to withdraw pin 192, pin 191 and the core supported thereby then move in the direction of arrow 205 to lower the core and shift the same in the reverse direction by one-half cell width, the parts then being again in the position shown in FIG. 4a. It will be understood that as many solenoid actuated pin assemblies such as disclosed in FIGS. 4a and 4b may be employed along the member 187' as necessary to support a core 19 of particular length.

Figure 5A:
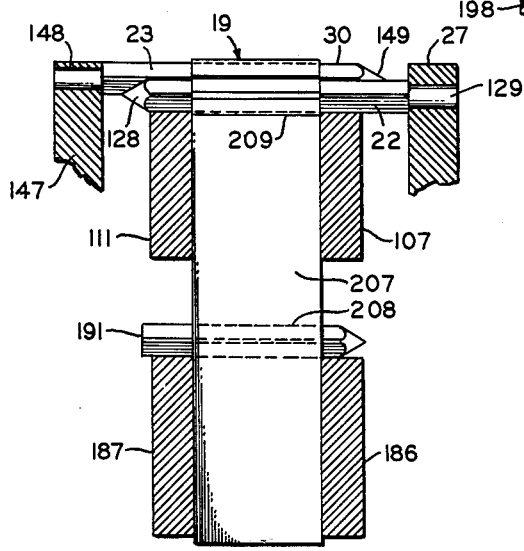
FIG. 5a is a fragmentary view illustrating a supporting arrangement for the core during initial fabrication.

As may be seen in FIG. 5, core 19 must be built up by several layers between the pins 22 and the support members 186 and 187 before the core can be supported thereon by pins 191 and 192. Accordingly, an arrangement has been provided as disclosed in FIG. 5a in which an elongated wood member 207, or the like, is perforated as at 208 to simulate the core. The core itself rests on the upper surface 209 of member 207 until it has been built up sufficiently to be supported by pins 191 and 192 as before described.

When each of the ends of core 19 is in position at the welding station comprising electrode pins 22 and welding wheels 25, two welding operations are performed before shuttling of the core again occurs. The first of these occurs prior to lowering of the core by one-half cell width preparatory to adding a new ribbon layer thereto, and the second occurs following lowering of the core and reverse winding of the ribbon 20a about the right end indexing pin 23, as best seen in FIG. 2. This reverse winding of the ribbon about the end pin 23 is accomplished manually, there being adequate clearance for this purpose and for training the ribbon 20a over the remaining index pins 23 by reason of the wheels 25 and holding fingers 24 being poised well above the ribbon and pins as best seen in FIG. 1. As a result of the reverse bending of the ribbon at the ends of the core, these ends 211, FIG. 4, are given a rounded configuration as best seen by the ends designated 211A and 211B in FIG. 2. End 211A was moved into its position as shown in FIG. 2 from a prior position in engagement with the end electrode pin 22, the movement between these two positions having occurred when the core was lowered diagonally downward to the right by one-half cell width in the manner aforedescribed. The core thus makes a one-half cell movement in the direction opposite from that of the last shuttling movement in either direction of movement of the core along the length of the ribbon. This has the advantage in that the end faces of the core as defined by the ends 211 lie at right angles to the sides of the core which lie along the length of the ribbon. Further shuttling of the core will move the same to the right as viewed in FIGS. 2 and 4, until the left end of the core moves into the welding station. Following welding of the alternate nodes in this end position, the core will be lowered diagonally downward to the left by one-half cell width and, following reversal and re-alignment of the ribbon over the indexing pins 23, the series of shuttling and welding operations will continue until the right end of the core again resumes its position at the welding station. At this time however, end 211B will then be in engagement with electrode pin 22 at the extreme right in FIG. 2.

Referring again to FIG. 4, a pin 191 at left end of core 19 is arranged to engage a switch 212 to close the same when the right end of the core shuttles into the welding station, as shown. In the following one-half cell movement of the core to the right, switch 212 is again opened. Similarly, a pin 192 placed at the right end of the core is arranged to engage a switch 113 and close the same as the left end of the core shuttles into the welding station. Switch 113 again opens in response to movement of the core by one-half cell width to the left, as aforedescribed. Switches 212 and 213 conveniently may be mounted for attachment to member 187 in different positions along the length thereof in accordance with the length desired for core 19, as these switches are connected in a control circuit hereinafter to be described to operate as limit switches and assure that a reversal in the shuttling direction occurs at the proper time.

The corrugated ribbon 20a is directed toward either side of the welding station by an elongated J-shaped guide 214 which, when in its full line position of FIG. 4, directs the ribbon into the left side of the welding station and, when in the dashed line position, directs the ribbon along the line 215 into the right side of the welding station. For this purpose, guide 214 is mounted on a pair of spaced brackets 216, 217 which conveniently are secured to side frame 38 as by fasteners 218. The ribbon is directed to guide 214 by way of a second guide 219 which is secured to and supported on a bracket 221 which forms a part of the corrugator generally designated 222.

Corrugator 222 comprises a base 223 to which bracket 221 is secured and upon which is mounted a die 224 appropriately formed in matching relation to the multi-stage punches 225, 226, and 227 to provide the desired corrugations in the ribbon disposed therebetween when the press 228 is power driven to bring the punches and die in interfitting relationship. In the arrangement shown, the dual-punch 225 merely seats in corrugations previously formed to thereby hold the ribbon in position on the die while two additional corrugations are formed in the ribbon by punches 226 and 227 which form their respective corrugations in successive order. Provision is also made for perforating the uncorrugated ribbon 20B by spaced pins 229 which are carried by the press 228 and therefore pierce the ribbon as the press engages the die to thus complete the cycle of operations performed by the corrugator 222. When press 228 is elevated to clear the ribbon, the ribbon is advanced two corrugation widths by a hitch feed of known type generally designated 231.

Hitch feed 231 comprises a base 232 which is supported on the base 223 of the corrugator. A feed member 233 is slidably mounted on member or base 232 and has a roller 234 which engages a cam 235 carried by press 228 of the corrugator. The arrangement is such that as the press lowers, the feed member 233 is driven thereby to compress a coil spring 236 disposed between feed member 233 and a member 237 fixed to a base 232. The initial spacing between members 233 and 237 is adjusted by a rod 238 upon which coil 236 is sleeved. Ribbon 20B is guided between each of members 233 and 237 and base 232 and, during the powered movement of feed member 233, the same slides freely over the ribbon which at this time is being held by punch 225. On the return stroke, under power of spring 236, feed member 233 grips the ribbon and advances the same the two corrugation widths aforementioned, the ribbon at this time sliding freely under fixed member 237. The ribbon conveniently is supplied from a reel 239 and passed over a guide wheel 240 to the hitch feed 231.

The operation of the machine in fabricating honeycomb core will best be understood by now making further additional reference to FIGS. 7 to 10. It will be understood that the core may be built up in as many layers as required and trimmed or sheared below the support members 186, 187 to thereby leave a block of core in operative relation to the parts of the machine in order to facilitate subsequent fabrication of additional core or, alternatively, when it is desired to start fabrication of the core from the first ribbon layer, the aforementioned block 207 may be inserted between the stripper bars 107 and 111 and supported on members 186 and 187 by use of pins 191 and 192. Assuming the latter case, with block 207 then generally occupying the position of core 19 in FIG. 4 and with the electrode fingers 22 bridging the stripper bars 107 and 111 and disposed directly above block 207, guide 214 is then moved to its dashed line position. Following line 215, ribbon 20A is then drawn under the welding wheels 25, over the pins 22, and thence over the length of block 207 as required to provide the desired length of core. The indexing pins 23 are next advanced over the ribbon and into bridging relation above the stripper bars and in nesting engagement with the electrode pins 22. Guide 214 is now returned to its full line position as seen in FIG. 4 and the corrugated ribbon is trained about the indexing pin at the extreme right in FIG. 4, trained under the welding wheels 25 and aligned into engagement with the remaining indexing pins such that the nodes of the upper and lower ribbon layers are aligned over the electrode pins. The ribbon will then extend from the indexing pins in guiding relation to the guide 214 in the manner as shown in FIG. 4. The machine is then ready for automatic operation.

Referring first to FIG. 8, operation of the machine is started by closing switches S1, S2, and S3 manually. When push button switch S1 is closed, energy from a generator G is supplied to the corrugator by way of a line 241 and a time delay relay 242 of conventional design. Energy is also applied by way of line 241 to the solenoid retained push button switch S3 and to the wipers W1 and W2 of a conventional stepper switch comprising an actuating coil 243 and a third wiper W3. The operation of the stepper switch is such that when coil 243 is energized, the wipers of the switch, which are all ganged as indicated by the dashed line therebetween, step ahead by one step into engagement with the succeeding contact in the bank of contacts individual thereto. Thus, when switches S1, S2 and S3 are closed, a circuit is completed to coil 243 of the stepper switch to advance the wipers of the switch from contact A to contact B of their respective banks, this circuit being completed from the generator G by way of switch S1, line 241, switch S3, parallel connected and normally closed switches S4 and S6, normally closed switch S7, contact A in contact with wiper W3, section R1 of the full wave rectifier, switch S2, stepper switch coil 243, and thence by way of rectifier section R2 to line 245 connected to the other side of generator G. On the reverse cycle of generator G, current passes by way of rectifier section R3, switch S2, in the same direction through coil 243 and thence to rectifier section R4 and back through the circuit just traced through switch S3 and switch S1 to the generator. Switch S3 is normally spring biased to open position but once actuated to closed position remains in this position as long as its actuating coil 244 remains energized. Coil 244 is connected between line 245 and switch S7 and hence is energized upon closing of switches S1 and S3.

Switches S4, S6 and S7 are best shown in FIG. 7 wherein it may be seen that switches S4 and S5 and similarly, switches S26 and S27, are ganged together and closed as by support bar 27 for electrode pins 22 whenever the pins are advanced into core engaging position. Similarly, switches S6, S7, S8, and S9 are ganged together and closed as by support bar 148 for indexing pins 23 whenever the indexing pins are advanced into core engaging position as shown in FIG. 7. Since it will be recalled that both sets of electrode and indexing pins were moved into this position in setting up ribbon 20a at the start of fabrication of core 19, switches S4 to S9 and switches S26 and S29 will all be closed.

When wiper W2 engages contact B, potential thereon is applied to coil 265 of a spring urged air valve 246. As best seen in FIG. 7, valve 246 is normally urged by spring 247 into the position shown in which air under pressure supplied from line 248 is applied by way of line 249 to the liquid in a tank 251. The air pressure in line 248 is supplied by way of valve 252 and at constant pressure as provided by regulating valve 253, the air under pressure being developed in tank 254 from the air compressor 255.

Liquid under pressure in tank 251 is applied by way of line 256 to the left end of piston 78 in hydraulic cylinder 75. Piston 78 is thus normally in its position as seen in FIGS. 7 and 7a in which position the welding carriage is retracted. Fluid at the head end of piston 78 is returned by way of line 257 to a tank 258 and the increase in air pressure therein is exhausted to the atmosphere by way of line 259 and valve 246.

It may also be noted that a second spring urged solenoid air valve 261 is positioned by its spring 262 such that air under pressure from line 248 is normally applied through valve 261 and line 263 therefrom to the tube 54 whereupon the tube is inflated and the welding wheels 25 are elevated in the manner aforedescribed. Air in tube 55 is exhausted by way of line 264 and thence through valve 264 to the atmosphere. Upon actuation of valve 246 by energization of its winding 265, air under pressure from line 248 is applied via line 259 from the valve and then to tank 258. Air pressure on the liquid in tank 258 applies a fluid pressure via line 257 to the head end of piston 78 whereupon the piston is moved to advance the welding carriage.

As movement of the welding carriage progresses, a cam 266 carried thereby engages a roller 267 and actuates a switch S10. Shortly thereafter a second cam 268 engages a roller 269 to actuate the same and close switch S11. Cam 268 is shorter than cam 266 and hence switch S11 is the first to open as rollers 269 and 267 roll down the inclines at the trailing ends of their respective cams 268 and 266.

When switch S10 closes, see also FIG. 8, a circuit is completed by way of a generator G, conductor 271, and switch S10 to the actuating winding 272 for solenoid valve 261, winding 272 being connected to conductor 245 and thence to the other side of generator G. On energization of winding 272, solenoid air valve 261 is actuated to apply air pressure from line 248 through the valve and line 264 to tube 55 whereupon this tube is inflated to lower the welding wheels 25 in the manner aforedescribed and air in tube 54 simultaneously is exhausted to the atmosphere by way of line 263 and valve 261.

When switch S11, see also FIG. 8, is closed, potential on lines 245 and 271 is applied across primary winding 273 which is disclosed as exemplary of the transformer system of the present invention. Voltage induced in secondary winding 274 is applied across a pair of welding wheels 25 connected in series through the electrode pins with which they are brought into electrical contact by way of the abutting nodes of the ribbons disposed therebetween, the pins so engaged completing the series circuit by way of their shorting support bar 27 in the manner aforedescribed. It will be understood that each of the other two pairs of welding wheels 25 are similarly connected each pair to its own secondary winding 274, only one of the three pairs of series circuits being shown in FIG. 8 for the sake of brevity. It will be understood further that the moment of contact of cam 268 with its coacting roller 269 and the length of the cam 268 are such that current flows to the welding wheels 25 approximately at the moment that the wheels engage the nodes to be welded thereby and that the flow of the welding current is discontinued approximately at the moment that the welding wheels leave the nodes in the course of the sweep of the welding wheels across the ribbons.

Shortly after switch S11 opens to discontinue the welding current, roller 267 leaves cam 266 whereupon switch S10 opens and winding 272 of air valve 261 becomes deenergized to thus restore the valve under power of spring 262 to the position as shown in FIG. 7. In this position, of course, tube 54 is inflated and tube 55 deflated such that the wheels 25 are elevated. Thus, as the welding carriage approaches the end of its forward stroke and is shifted sideways by one corrugation width as cam 118 engages cam 127, FIG. 7a, the welding wheels 25 are elevated sufficiently to clear the holding fingers 24 as aforedescribed.

In the operation of the machine as thus far described, one-half of the welding cycle has been completed and the welding wheels 25 have advanced from their position shown in FIG. 9A to that of FIG. 9B. It will be noted in FIG. 9B that the welding wheels 25 are now in position to sweep back across the intermediately spaced electrode pins 22 to complete the welding cycle. This is initiated by switch S12, FIG. 7a, which is closed by cam 118 as the same is shifted sideways upon engagement with fixed cam 127.

Referring again to FIG. 8, when switch S12 closes, a circuit is completed to coil 243 of the stepper switch by way of potential on wiper W1 in contact with contact B, switch S12, and wiper W3 in contact with contact B. Accordingly, the wipers of the stepper switch are advanced to contact C. When wiper W2 moved out of contact with its contact B, the circuit to winding 265 of air solenoid 246 was broken and valve 246 moved under power of its spring 247 to thus position the valve for return of piston 78 to the head end of cylinder 75 to thus cause the welding carriage to begin the sweep of welding wheels 25 back across the aligned ribbons. On the return stroke, switches S10 and S11 are again operated by their respective cams 266 and 268 to again lower and subsequently raise the welding wheels 25 and, during their period of engagement with the ribbons, to provide for passage of the welding current, all in the same manner as aforedescribed. As the welding carriage nears the end of its return stroke, cam 118 engages and is actuated by cam 123 to return the welding carriage to its initial position as depicted in FIGS. 7a and 9C. In moving into this position, cam 118 closes a switch S13 which opened when the welding carriage began its sweep of the welding wheels across the ribbons.

As switch S13 again becomes closed upon full retraction of the welding carriage, a circuit for energizing winding 243 of the stepper switch is completed by way of potential on wiper W1 in contact with its contact C, switch S13, and wiper W3 in contact with its contact C. Accordingly, the wipers of the stepper switch are advanced into engagement with their respective contacts D. In this position, potential on wiper W2 in contact with its contact B is applied to winding 275 of a solenoid controlled air valve 276, the winding being connected between contact D and conductor 245 at the other side of generator G.

Referring to FIG. 7, it will be seen that prior to energization of winding 275, valve 276 is in such position that air pressure on line 248 is applied by way of line 277 to the head end of piston 143 in cylinder 141 whereupon piston 143 occupies the rod end of cylinder 141 to thus position the electrode fingers 22 in their core engaging position as aforementioned. Upon energization of winding 275, air valve 276 is actuated thereby such that air pressure on line 248 is now directed by way of line 278 to the rod end of the cylinder motor 141 and thus the piston 143 is driven toward the head end of the cylinder to withdraw the electrode fingers 22 axially from engagement within the core as depicted in FIG. 9D. As support bar 27 for electrode pins 22 moves into its fully retracted position, a switch S14 is closed thereby to provide for further energization and stepping of the stepper switch, the circuit to winding 243 of the stepper switch now being completed by way of potential on wiper W1 in engagement with its contact D, switch S14, and wiper W3 in engagement with its contact D. Accordingly, the wipers of the stepper switch are advanced into engagement with contacts E.

In position E of the stepper switch, potential on wiper W2 is applied by way of its contact E in engagement therewith to the pole 279 of a manually controlled double pole double throw switch generally designated 281. In this position of switch 281 as shown in FIG. 8, potential on pole 279 is applied by way of closed switch S9 to a winding 282 of a solenoid actuated air valve 283, the winding being connected on the other side to conductor 245 whereupon the same is energized from generator G.

Upon energization of winding 282 of solenoid valve 283, see also FIG. 7, the valve is moved from the spring-urged inactive position shown into a position in which air pressure from line 248 is applied by way of line 284 to the head end of cylinder motor 179. Piston 183 then moves from a central position in cylinder 179 to which it previously had been limited by reason of the hand manipulated block 285, see FIGS. 4 and 7, interposed between side frame member 38 and slide support member 153, to the rod end of cylinder 179. Piston rod 184, which makes connection with the indexing pin assembly including slide support 153, accordingly moves this assembly and core 19 supported on the indexing pins to the right as viewed in FIG. 4 and as depicted graphically in FIG. 9E.

Referring again more particularly to FIG. 7, as piston 183 approaches the rod end of cylinder 179, a pair of ganged switches S15 and S16 are engaged and closed as by slide support member 153. The circuit controls effected by these switches are disclosed in FIG. 8 wherein it may be seen that switch S15 connects time delay relay 242 to conductor 245 at the other side of generator G whereupon relay 242 is operated for a predetermined interval of time to supply current by way of line 286 to corrugator 222 to operate the same, the interval of operation of the time delay relay being adjusted such that 12 additional corrugations are formed in ribbon 20B supplied by hitch feed 231 during the interval in which the time delay relay is operated thereby to replace the 12 corrugations just previously shuttled from the welding station and added to the core 19 during the welding cycle of wheels 25 in sweeping forward and back across the ribbons aligned on the electrode pins.

When switch S16 closed, it completed the energizing circuit to winding 243 of the stepper switch by way of potential on wiper W1 in contact with contact E, switch S16, and wiper W3 in contact with its contact E whereupon the wipers are advanced to their contacts F. In this position, wiper W2 applies potential thereon by way of its contact F to actuating winding 287 of solenoid valve 276 to thereby position the same such that air under pressure in line 248 is applied by way of valve 276 and line 277 whereupon pressure on the head end of piston 143 moves the same toward the rod end of cylinder 141 with the result that the electrode pins 22 are moved axially to re-enter the cells of core 19. Simultaneously, with the energization of winding 287 of solenoid valve 276, potential on wiper W1 is applied by way of its contact F to an actuating winding 288 of a solenoid air control valve 289. Prior to energization of winding 288, solenoid valve 289 is in the position shown in FIG. 7 wherein air pressure on line 248 is applied by way of the valve and line 291 to the head end of piston 158 in cylinder 155 with the result that the piston occupies the rod end of cylinder 155 which is the position required for the indexing pins 23 to be in their core engaging position. Upon energization of winding 288, valve 289 is positioned such that air pressure on line 248 is applied through the valve by way of line 292 to the rod end of piston 158 to thus move it toward the head end of cylinder 155 and thus withdraw the indexing pins 23 from engagement with core 19, this position being depicted graphically in FIG. 9F wherein it may be seen that the electrode pins 22 have re-entered the core and, simultaneously, with such re-entry, the indexing pins 23 have withdrawn from the core.

A switch S17 is closed as by support bar 148 for the indexing pins 23 when these pins become fully withdrawn from the core. Switches S4 and S5 are also again closed as the electrode pins 22 simultaneously re-enter the core as the indexing pins 23 withdraw therefrom. When switches S5 and S17 are both closed, as is now the case, a circuit is again completed for actuating the stepper switch by way of potential on wiper W1 in engagement with contact F, switches S17 and S5, and wiper W3 in engagement with its contact F. Since winding 243 of the stepper switch is energized through this circuit, the wipers of the switch are advanced into engagement with their contacts G.

In position G of the stepper switch, potential on wiper W2 is applied by way of contact G connected to pole 293 of double pole double throw switch 281 and thence by way of switch S26 to winding 294 of solenoid control air valve 283. Upon energization of winding 294, solenoid valve 283 is moved into position thereby such that air pressure on line 248 is applied by way of the valve to line 295 in communication with the rod end of air motor cylinder 179 with the result that piston 183 is returned towards its center position as shown in FIG. 7, in which position it is stopped by reason of the aforementioned hand manipulated block 285 being interposed between the slide support 153 and side frame member 38. Indexing pins 23 are thus returned by piston 183 and interconnecting rod 184 to their positions of approximate axial alignment with electrode pins 22 but still withdrawn therefrom and from the core as depicted graphically in FIG. 9G. As the indexing pins return to this position, the roller 296 for actuating switch S18 is engaged as by the common support bar 148 for the indexing pins 23. As switch S18 closes, a circuit is again completed for energizing the stepper switch by way of potential on wiper W1 in engagement with contact G, switch S18, and wiper W3 in engagement with its contact G whereupon winding 243 is energized and the wipers of the stepper switch are advanced into engagement with their contacts A.

In position A of the stepper switch, potential on wiper W2 in engagement with its contact A is applied to winding 297 of air solenoid control valve 289 with the result that the valve is positioned to apply air pressure on line 248 by way of the valve and line 291 to the head end of piston 158 whereupon the same is moved toward the rod end of cylinder 155 and the indexing pins 23 are moved to re-enter the core 19, the electrode and indexing pins now occupying the positions relative to core 19 and wheels 25 as depicted in FIG. 9H. A complete cycle of operations involved in a normal shuttling movement of the core 19 has now been completed, it being noted that the position of the electrode and indexing pins and the welding wheels are the same in FIG. 9H as initially in FIG. 9A, the disclosure of these partial figures differing only in that the core 19 is advanced to the right as seen in FIG. 9H.

During the previously described cycle of operations involved in the shuttling movement, switch S4 opened as the electrode pins 22 withdrew from core 19. However, at this time, indexing pins 23 were in their core engaging position and hence switch S6 was closed and was still closed when the electrode pins re-entered the core to again close switch S4. Consequently, when switch S6 opened as the indexing pins 23 were withdrawn from their core engaging position, switch S4 was closed to maintain and continue energization of winding 244 for holding switch S3 in its actuated position. Thus, when switches S6 to S9 again closed as the indexing pins were returned to their core engaging position, the circuit is automatically completed through switch S3 and switches S4, S6, and S7 to recycle the stepper switch through its contacts A to G to again shuttle the core to the right, as viewed in FIGS. 4 and 9, by another increment of corrugation widths or group of nodes corresponding to the number of the electrode pins and hence to the number of nodes welded during each cycle of the welding operations, this being 12 in number in accordance with the arrangement disclosed.

This shuttling movement to the right is continued as many times as necessary to bring a pin 192 at the extreme right end of the core 19 into actuating engagement with switch 213, FIG. 4. Upon actuation of switch 213, its ganged switches S19 and S20 are closed. As may be seen in FIG. 8, switch S19 connects winding 288 of solenoid valve 289 to contact D engageable by wiper W1 of the stepper switch. However, at this stage of the cycle of operations of the stepper switch in shuttling the core into its end position for actuation of switch 213, the wipers of the stepper switch are in engagement with their contacts E which, it will be recalled, is the position in which the potential on wiper W2 actuates solenoid valve 283 such that air motor 179 shuttles the indexing pins 283 and the core supported thereon. In position E potential on wiper W2 is also applied by way of contact E to switch S21 which is ganged with switch S17. However, since the indexing pins are not withdrawn, these switches are not closed at this time. Consequently, the stepper switch completes this shuttling cycle which has moved the core into its end position, and continues into its next cycle through positions A, B, and C to complete the welding cycle, as aforedescribed.

When the welding cycle is completed and the wipers of the stepping switch move into position D, potential on wiper W2 is effective, as before, in engagement with contact D to cause valve 276 to effect withdrawal of the electrode pins 23. In addition to this movement in this position, wiper W1 in contact with its contact D also applies potential by way of switch S19 to winding 288 of air valve 289 with the result that the indexing pins 23 are also withdrawn from the core at this time. As a result of the withdrawal of all the electrode and indexing pins, all of switches S4 through S9 are now open with the result that holding winding 244 for switch S3 is de-energized and switch S3 is opened. Switch S14 closes, as before, with withdrawal of electrode pins and, as a result, the wipers of the stepper switch are advanced into position E, as beforedescribed. Wiper W2 in this position is ineffective to actuate the shuttling valve 283 by reason of switches S8 and S9 and switches S26 and S27 now being opened. Potential on wiper W2 however, is applied by way of its contact E and switch 21, which closed upon withdrawal of the indexing pins, and a circuit is thus completed to ground by way of switch S20 conductor track 203, sliding contact 202, and solenoid winding 194 whereupon solenoid winding 194 is energized to retract pin 192 and thus lower the core diagonally downward and to the left by by one-half cell width.

This movement of the core to the left re-opens switch 213 and pins 192 re-enter the core under power of their springs 200, the parts then being in the positions as indicated in FIGS. 4b and 4a. At this time potential on wiper W1 in contact with its contact E is applied by way of closed switch S18 which is closed at this time by reason of the indexing pins 23 being withdrawn from the core. Switch S18 is connected in parallel with switches S25 and S16, and a circuit is completed in lieu thereof by switch S18 to step the stepper switch from its position E to its position F to effect return of the electrode pins into their core engaging position in the manner aforedescribed. Since the indexing pins at this time are already withdrawn, potential on wiper W1 in contact with its contact F is ineffective at this time to withdraw the indexing pins. Although switch S17 is closed by reason of the indexing pins being withdrawn, wiper W1 in contact with its contact F is not effective to move the stepper switch into its position G until switch S5 closes upon return of the electrode pins into their core engaging position. It will thus be seen that the arrangement is such that the stepper switch cannot advance from position F to position G unless two conditions exist; namely, that (1) the indexing pins are withdrawn and (2) the electrode pins are in core engaging position.

In position G, wiper W2 in engagement with its contact G is ineffective to operate the solenoid valve 283, although switch S26 is closed, by reason of the already retracted position of the indexing pins 23. By the same token, switch S18 is closed and potential on wiper W1 in contact wtih its contact G is effective through switch S18 and wiper W3 in engagement with its contact G to complete the circuit to winding 243 of the stepper switch and thus advance the same to its position A in which a circuit is complete, as before, to effect return of the indexing pins into their core engaging position.

Although switches S4, S6, and S7 become closed as the indexing pins return to their core engaging position, it will be recalled that holding winding 244 for switch S3 became de-energized when both of switches S4 and S6 opened with withdrawal of both the electrode and indexing pins as the wipers moved into the position D during the previous switching cycle of the stepper switch. Accordingly, further automatic operation of the machine is brought to a stop to permit adjustment of ribbon guide 214 into its dashed line position as shown in FIG. 4 and to permit reverse winding of the ribbon around the leftmost indexing pin and training of the ribbon under the welding wheels 25 and over the remaining indexing pins 23 such that the ribbon will now lie along the line 215 in readiness for the core 19 to be shuttled to the left as viewed in FIG. 4. In addition to these preparations, hand manipulated block 25 must now be removed from the left side of the machine and inserted between slide support 153 and the right side frame member 37 into the position indicated by the dashed lines in FIG. 7. With reference to FIG. 8, double pole double throw switch 281 must now be moved into its position as indicated by the dashed lines. With these preparations completed, the machine is now in readiness to perform the first welding cycle of the alternately aligned nodes at the extreme left end of the core.

The welding cycle is started, as before, by depressing switch S3 and the operations of the machine are the same as described before for a normal shuttling movement of the core with the exception that with switch 281 in its dashed line position, windings 282 and 294 are energized through switches S27 and S8 respectively and in reverse order from that heretofore described in order that piston 183 will be moved from its central position to the head end of cylinder 179 to thus shuttle the core to the left as viewed in FIG. 4. Upon withdrawal of the indexing pins from the core, the piston is returned to its central position to thus return the electrode pins into their position of axially extended alignment with the electrode pins, the return movement of the indexing pins being terminated in this position by reason of block 285 now occupying its dashed line position as indicated in FIG. 7.

As the indexing pin assembly approaches its shuttling movement to the left as viewed in FIG. 4, it engages and closes a pair of ganged switches S22 and S25 which respectively energize the time delay relay 242 to thus operate the corrugator and energize winding 243 of the stepper switch to thus advance the stepper switch in the same manner as accompilshed by switches S15 and S16 as heretofore described.

Shuttling of the core to the left in increments of 12 corrugations at a time is thus accomplished much in the same manner as the shuttling of the core to the right as aforedescribed. When the extreme right end of the core reaches the welding station, switch 212 is engaged by a support pin 191 and actuated thereby. When this happens, its ganged switches S23 and S24 are closed such that on the foliowing cycle of the stepper switch both the electrode and indexing pins are withdrawn as the wipers move into position D and solenoid 193 is actuated to withdraw pins 191 as the wipers move into position E. Consequently, the core is moved diagonally downward to the right by one-half cell width to thus again open switch 212. The stepper switch then completes its cycle, as beforedescribed, and stops at the end of this cycle by reason of switch S3 being open to permit winding winding and aligning of the ribbon into the position as shown in FIG. 4.

The machine has now performed a complete cycle of operations in that the core has first been shuttled over its length in one direction, to the right as disclosed, and then shuttled over its length in the reverse direction, this being to the left in the assumed example. By way of summary, this shuttling movement of the core first in one direction along the length thereof, and then in the reverse direction is depicted graphically in FIG. 10 wherein the electrode pins are designated by the letter $e$ and the indexing pins are designated by the letter $i$. In FIG. 10A the core 19 is pictured in readiness for welding and then shuttling to the right. In FIG. 10B the electrode pins are shown withdrawn from the core and the core advanced to the right with the indexing pins. From this position the electrode pins will advance into the core and the indexing pins simultaneously therewith will withdraw from the core, after which the indexing pins will shift to the left and re-enter the core as shown in FIG. 10C. Following the welding cycle, the electrode pins will again withdraw from the core and the core and the indexing pins will again shuttle to the right as depicted in FIG. 10D. FIG. 10E depicts the electrode and indexing pins back into core engaging position to complete the final welding cycle to be performed on the core in its excursion from position A to position E. Following rewinding of the ribbon and with the electrode and indexing pins in the positions shown in FIG. 10E, the first welding cycle to be performed on the newly added layer is begun. Upon completion of the welding cycle in position E of FIG. 10, the core is shuttled to the left as depicted in FIG. 10F and again welded in the position indicated in FIG. 10G. The core is thereafter shuttled again into its final position to the left as indicated in FIG. 10H and the final welding cycle is completed in the position depicted in FIG. 10I. Following lowering of the core in this position, the parts will occupy the same position as depicted in FIG. 10A and a complete cycle of operations will have been completed.

Operation of the honeycomb core fabricating machine of the present invention is predicated generally upon the principle of a continuously fed corrugated ribbon. In order to maintain the continuity of the ribbon, the end of one ribbon section may be joined to that of a succeeding ribbon section by means of a splicer 300 of known design as depicted in the block diagram of FIG. 11 or, alternatively, it has been found in practice that the sections may be welded together in the machine itself, the machine being designated as a fabricator 301 in FIG. 11. In its simplest form splicer 300 could merely be a welding tool operable by hand to tack weld the succeeding sections together sufficiently for adequate feeding to and welding by the welding wheels and electrode pins of fabricator 301. Alternatively, the splicer 300 may make spot welding operations in response to pulses received from the program control designated 302.

The splicer may be eliminated where provision is made, either manually or by machine, to present the ends of succeeding sections to be joined in overlapping relation to a welding wheel 25 and its coacting electrode pin. In this case three thicknesses of ribbon are presented for welding between the wheel and its electrode pin. It has been found in practice, however, that notwithstanding the increase in thickness of the material to be welded between the electrodes, satisfactory welds are obtained and preliminary splicing of the succeeding sections is therefore not required. It will be understood, however, that the splicing of the ribbon prior to presentation at the fabrication facilitates feeding of the ribbon thereto. It has also been found in practice in the use of the machine of the present invention, that the spacing between the electrode and indexing pins is such that ribbons of variable thickness may be assembled therebetween for welding of the adjoining nodes, it being noted from FIG. 2 that any added thickness at the nodes due to a splice would be accommodated below the welding wheel 25 by reason of the yieldable pressure applied thereto and would be accommodated below the indexing and electrode pins by reason of the clearance provided at the underside of the pins as aforementioned.

A core 19A, FIG. 11, may thus be fabricated, for example, from ribbons R1, R2 and R3 of different thicknesses such that core 19A may have an outer or "picture frame" section formed of one thickness ribbon R1, a central or "slug" section formed of relatively thicker ribbon R3 and an intermediate section formed of relatively thinner ribbon R2. In this manner, various structural configurations and strength variables may be introduced into the core during fabrication thereof.

It may fairly be seen in FIG. 11, that several layers of ribbon R1 at the bottom of core 19A are fabricated before short sections of ribbon R2 are introduced and alternated with successive short sections of ribbon R2 to form the core up to the point where short sections of ribbon R3 are introduced to form the central slug of the core. At such time, the order of introduction of the ribbon sections will follow the pattern R3, R2, R1 to the right and double back to the left, R2, R3, R2, R1 to the left and double back to the right, R2, R3, etc., until the last section of R3 has been introduced. Thereafter the sequence R2, R1 to right and double back to the left, R2, R1 to the left and double back to the right, R2, R1 to the right and double back to the left, etc., will be repeated until the last section of ribbon R2 is introduced after which ribbon R1 only will be added to complete the several layers of ribbon R1 comprising the border at the top of the core.

In order to mechanize the fabrication of core 19A, ribbons R1, R2 and R3 may be supplied from reels 303, 304 and 305 individual thereto and each directed to its own degreaser 307, hitch feed 231 and corrugator 222. Each of the corrugators, in turn, has its own shear 308 to which the corrugated ribbon is directed and from which it passes to splicer 300, suitable ribbon guides 309 and 311 being employed in the cases of ribbons R2 and R3.

Program control 302 may be of any type suitable for the purpose and may, for example, take the form of three counters located respectively at the three corrugators 222 and each actuated thereby to make a count for each corrugation formed by its associated corrugator. Switches individual to the counters and arranged to supply energy to the corrugators and to their associated shears, in turn, may be actuated by the counters when the same have counted predetermined numbers of corrugations in accordance with the pattern desired in the core being fabricated.

Thus, energy may be supplied to the corrugator for ribbon R1 by way of line 312 from program control 302 to actuate the corrugator and supply sufficient corrugated ribbon R1 to form a core 19A up to the point where ribbon section R2 must be injected. When the length of ribbon R1 required for this purpose has been counted out by the counter associated with the R1 corrugator, the switch actuated by the counter at such time will discontinue energy to the corrugator, actuate its associated shear by energy supplied by way of line 313, and direct energy by way of line 314 to the corrugator for ribbon R2 whereupon feeding of ribbon R2 will begin and counting of the corrugations thereof will be started. The timing and feeding of the ribbons R1 and R2 are such that the leading end of ribbon R2 will ride into the splicer 300 on the trailing end of ribbon R1, and the splicer will be actuated by energy received by way of line 315 to bond the adjoining nodes when the same move into a bonding station located within the splicer. A switch located at the splicer and responsive to the appearance of two overlapping ribbons at its welding station may be employed to energize the splicer via line 315.

After a predetermined number of corrugations of ribbon R2 have been counted by the counter associated with its corrugator, a switch actuated thereby will discontinue energy to the corrugator, direct energy to its shear for operation of the same by way of line 316 and direct energy via line 312 to again effect feeding of corrugated ribbon R1 to the fabricator. This process will be repeated until the counter in the R2 channel has counted out a predetermined number of corrugations which then calls for feeding of a section of corrugated ribbon R3 to the fabricator.

When this happen, the R2 counter will actuate a switch which will stop its corrugator, operate its associated shear to terminate the section of R2 currently being supplied to splicer 300, and direct energy via line 317 to the corrugator 222 for ribbon R3 whereupon feeding of this ribbon and counting of its corrugations will begin. After an appropriate number of corrugations have been formed, the leading edge of ribbon section R3 will move into splicer 300 in overlapping relation to the trailing edge of ribbon section R2 and when the overlapping nodes arrive at the splicer welding station energy supplied via line 315 will bond the same together.

After the counter for ribbon R3 has counted out a predetermined number of corrugations, a switch actuated thereby will stop operation of the R3 corrugator and actuate its associated shear by energy supplied via line 318. This switch will also direct energy by way of line 314 to again effect further feed of corrugated ribbon R2 to the fabricator after which, in accordance with the pattern of core 19A, another section of ribbon R1 will be supplied thereto.

It suffices herein to state that additional operations of the control system of FIG. 11, generally similar to those just described, will be performed to complete the core 19A as disclosed, or to produce other cores having different structural configurations and patterns through appropriate programming of the counters and their associated switches.

From the foregoing it will be apparent to those skilled in the art to which the fabrication of the present invention relates or most closely apertains, that the same also lends itself very well to an arrangement in which the machine is shuttled relative to the core which would be stationary, the indexing pins in such case performing a follow up shuttling movement relative to that of the electrode pins in contradistinction to the arrangement hereinbefore disclosed wherein the electrode pins merely move axially into and out of the core and the indexing pins move in a closed rectangular path.

This invention may be embodied in other forms or carried out in other ways without departing from the spirit or essential characteristics thereof. The present embodiments of the invention are therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In a machine for fabricating honeycomb core layer by layer from a continuous metallic ribbon secured to the core, the combination of means for shuttling the core and ribbon into positions of alignment of corresponding nodes in increments over the length of the core and in opposite directions alternately from layer to layer, means for bonding the aligned nodes, and means operable in response to shuttling of the core into either of its end positions and following said bonding of the nodes in said end positions for lowering the core by one-half cell width and simultaneously shifting the core by one-half cell width in the reverse direction.

2. In a machine for fabricating honeycomb core layer by layer from a continuous metallic ribbon, the combination of means including a plurality of internesting electrode and indexing pins for supporting corresponding nodes of adjacently disposed and oppositely corrugated ribbon layers of the core in positions of alignment and abutment on said electrode pins, means including said electrode pins for bonding said aligned and abutted nodes together, and means including said indexing pins for shuttling said core relative to said electrode pins and over the length of the core in increments of corrugation widths corresponding to the number of said electrode pins and in opposite directions alternately from layer to layer.

3. In a core fabricating machine as in claim 2, said bonding means comprising a plurality of welding wheels and means for moving said wheels along alternately spaced electrode pins and back along the intermediate electrode pins.

4. In a core fabricating machine as in claim 3, said bonding means comprising a series circuit for passing welding current between each pair of alternately spaced electrode pins each in series with its associated welding wheel.

5. In a core fabricating machine as in claim 2 and further comprising means operable in timed relation to bonding of said aligned nodes for withdrawing said electrode pins from the core, means operable in response to withdrawal of said electrode pins for initiating said shuttling of the indexing pins and core, means operable in response to shuttling of said indexing pins and core for withdrawing said indexing pins axially from the core and conjointly returning said electrode pins axially into the core, means operable in response to withdrawal of the indexing pins from the core for reversely shuttling said indexing pins into withdrawn alingment with said electrode pins, and means operable in response to said reverse shuttling of said indexing pins for returning the indexing pins axially into the core.

6. In a machine for fabricating honeycomb core as in claim 2 and further comprising means operable in time delayed relation to the bonding of said aligned nodes at an end of the core for lowering the core by one-half cell width and simultaneously shifting the core by one-half cell width in the reverse direction from said shuttling direction.

7. In a core fabricating machine as in claim 2 and further comprising means for feeding and corrugating said ribbon, means for directing said corrugated ribbon initially to the leading end of said shuttled core and in the shuttling direction thereof, means including said indexing pins for aligning said nodes on said electrode pins, means operable in timed relaton to the operation of said bonding means for holding said aligned nodes in abutting relation preparatory to and during said bonding thereof, and means including said holding means for urging the ribbon layer being added to the core into position of alignment of its edge with the planar face defined by the corresponding edges of previously added layers of the core.

8. In a machine for fabricating honeycomb core layer by layer from a continuous metallic ribbon secured to the core, the combination of means for feeding and corrugating the ribbon, means for shuttling the core and ribbon secured thereto in increments over the length of the core as measured longitudinally of the ribbon layers and in opposite directions alternately from layer to layer, means for directing and feeding the corrugated ribbon initially toward the leading end of the shuttled core and in the direction of shuttling thereof, means operable in response to shuttling of the core into either of its end positions for lowering the core by one-half cell width and simultaneously shifting the core by one-half cell width in the reverse direction, and means for reversing the direction of feed of the corrugated ribbon toward the other end of the core following said lowering of the core.

9. In a machine for fabricating honeycomb core layer by layer from a continuous metallic ribbon secured to the core, the combination of means for feeding and corrugating the ribbon, means for directing and feeding the corrugated ribbon initially toward one end of the core and into positions of alignment of successive groups of its nodes with those of the adjacently disposed oppositely corrugated ribbon layer of the core, means for bonding said aligned nodes together, means operable in timed relation to said bonding of the nodes for shuttling the core over the length of the core in increments corresponding to said groups of nodes and in opposite directions alternately from layer to layer, means operable in response to shuttling of the core into either of its end positions and following said bonding of the nodes in said end positions for lowering the core by one-half cell width and simultaneously shifting the core by one-half cell width in the reverse direction, and means for reversing the direction of feed of the corrugated ribbon following said lowering of the core.

10. In a machine for fabricating honeycomb core from metallic ribbon, the combination of means individual to each of a plurality of ribbons of different thicknesses for separately feeding, corrugating and shearing said ribbons, means operable in timed relation to said corrugation means for feeding predetermined sectional lengths of said ribbons end to end in predetermined successive order to form a continuous length of corrugated ribbon of varying thickness in accordance with the predetermined structural pattern of a core to be fabricated therefrom, and means for successively assembling and bonding adjacently disposed and oppositely corrugated layers of said core from said continuous length of corrugated ribbon and in accordance with said predetermined pattern.

11. In a machine for fabricating honeycomb core from metallic ribbon, the combination of means including a plurality of internesting electrode and indexing pins for assembling successive layers of core from a continuous length of corrugated ribbon doubled back and forth upon itself with adjacently disposed and oppositely corrugated nodes successively aligned and abutted in engagement on said electrode pins, means including a plurality of welding wheels engageable with said aligned and abutted nodes for passing welding current therethrough to said electrode pins thereby to bond said nodes together, yieldable pressure means individual to said wheels for equalizing the pressure applied thereby to said nodes while permitting variations in thickness thereof, and means including said indexing pins for effecting relative shuttling movements of said core and electrode pins in either direction longitudinally of said ribbon layers when the electrode pins are withdrawn from the core, said electrode and indexing pins conforming on the upper surfaces thereof to the desired cell configuration of the core and having cut-back lower surfaces to provide clearance for said thickness variations in the nodes.

12. In a machine for fabricating honeycomb core from metallic ribbon, the combination of means including a plurality of internesting electrode and indexing pins for assembling successive layers of core from a continuous length of corrugated ribbon doubled back and forth upon itself with adjacently disposed and oppositely corrugated nodes successively aligned and abutted in engagement on said electrode pins, means including a plurality of welding wheels engageable with said aligned and abutted nodes for passing welding current therethrough to said electrode pins thereby to bond said nodes together, yieldable pressure means individual to said wheels for equalizing the pressure applied thereby to said nodes while permitting variations in thickness thereof, and means including said indexing pins for effecting relative shuttling movements of said core and electrode pins in either direction longitudinally of said ribbon layers when the electrode pins are withdrawn from the core.

13. In a core fabricating machine as in claim 2, said bonding means comprising a plurality of welding wheels and means for moving said wheels along electrode pins individual thereto.

14. The method of fabricating honeycomb core of unlimited length from a continuous corrugated metallic ribbon tethered thereto and layer by layer vertically downward with respect to a plurality of horizontally disposed electrode pins insertable into the upper layer of cells of the core, said method comprising the steps of successively lowering the core layer by layer with respect to said electrode pins while the same are withdrawn from the core and doubling said ribbon back and forth upon itself layer by layer and over the length of the core thereby to form the successive layers of cells of the core, indexing the core longitudinally thereof with respect to the electrode pins while the same are withdrawn from the core and successively along and over the length of the core and in opposite directions alternately from layer to layer thereby to draw successive incremental lengths of said tethered ribbon by and over the core and into positions of alignment and abutment of the nodes thereof with corresponding nodes of the upper ribbon layer of the core, inserting the electrode pins into the core following each of said indexing movements thereof and into supporting relation with respect to said aligned and abutting nodes, and passing welding current to the electrode pins through said aligned and abutting nodes thereby to bond the same together.

15. The method of core fabrication as in claim 14, said lowering of the core with respect to the electrode pins being by one-half cell width and alternately at opposite ends of the core, said indexing of the core longitudinally thereof being by one-half cell width concurrently with said lowering of the core and in the reversed indexing direction, and each of the successive longitudinal indexing movements in the reversed indexing direction being by an increment of cells corresponding to the number of said electrode pins.

16. The method of core fabrication as in claim 14 and comprising the additional steps of corrugating said ribbon and feeding the same to the core in timed relation to said indexing movements of the core and said drawing of the corrugated ribbon by and over the core.

References Cited in the file of this patent

UNITED STATES PATENTS

| | | |
|---|---|---|
| 2,780,716 | Wasilisin | Feb. 5, 1957 |
| 2,821,616 | Spott | Jan. 28, 1958 |
| 2,843,722 | Wegeforth | July 15, 1958 |
| 2,927,991 | Shoelz | Mar. 8, 1960 |
| 2,985,743 | McKeen | May 23, 1961 |
| 3,028,481 | Covert | Apr. 3, 1962 |
| 3,051,824 | Wilson | Aug. 28, 1962 |